US008788295B1

(12) United States Patent
Wargin et al.

(10) Patent No.: US 8,788,295 B1
(45) Date of Patent: Jul. 22, 2014

(54) REUSABLE PRODUCT SYSTEM

(75) Inventors: Jeffrey M. Wargin, Rancho Palos Verdes, CA (US); Gail E. McGiffin, Summit, NJ (US); Timothy E. LeCam, Charlestown, MA (US)

(73) Assignee: Accenture Global Services Limited, Dublin (IE)

( * ) Notice: Subject to any disclaimer, the term of this patent is extended or adjusted under 35 U.S.C. 154(b) by 905 days.

(21) Appl. No.: 12/569,621

(22) Filed: Sep. 29, 2009

Related U.S. Application Data

(60) Provisional application No. 61/101,608, filed on Sep. 30, 2008, provisional application No. 61/101,633, filed on Sep. 30, 2008.

(51) Int. Cl.
*G06Q 40/00* (2012.01)

(52) U.S. Cl.
USPC ................................ 705/4; 715/764; 715/765

(58) Field of Classification Search
USPC ....................................... 705/4; 715/764, 765
See application file for complete search history.

(56) References Cited

U.S. PATENT DOCUMENTS

| | | | |
|---|---|---|---|
| 5,523,942 A * | 6/1996 | Tyler et al. ......................... | 705/4 |
| 5,655,085 A | 8/1997 | Ryan et al. ....................... | 364/401 |
| 5,991,823 A | 11/1999 | Cavanaugh, III et al. .... | 709/304 |
| 6,018,743 A | 1/2000 | Xu ................................ | 707/103 |
| 6,134,559 A | 10/2000 | Brumme et al. .............. | 707/103 |
| 6,523,042 B2 | 2/2003 | Milleker et al. ............. | 707/102 |
| 7,043,687 B2 | 5/2006 | Knauss et al. ................. | 715/513 |
| 7,162,534 B2 | 1/2007 | Schleiss et al. ............... | 709/232 |
| 7,451,097 B1 | 11/2008 | Faupel et al. ..................... | 705/4 |
| 7,631,299 B2 | 12/2009 | Kannenberg | |
| 7,774,217 B1 * | 8/2010 | Yager et al. ...................... | 705/4 |
| 2001/0034619 A1 | 10/2001 | Sherman ........................... | 705/4 |
| 2001/0056398 A1 | 12/2001 | Scheirer .......................... | 705/38 |
| 2002/0173995 A1 | 11/2002 | Schiminovich .................. | 705/4 |
| 2003/0036947 A1 | 2/2003 | Smith, III et al. .............. | 705/10 |
| 2003/0055767 A1 | 3/2003 | Tamura et al. .................. | 705/36 |
| 2003/0101132 A1 | 5/2003 | Gaubatz et al. ................. | 705/38 |
| 2003/0115207 A1 | 6/2003 | Bowman et al. ............. | 707/100 |
| 2003/0144910 A1 | 7/2003 | Flaherty et al. ................. | 705/22 |
| 2003/0204583 A1 | 10/2003 | Kaneda et al. ................ | 709/223 |

(Continued)

FOREIGN PATENT DOCUMENTS

JP    2001-306792    11/2001    .............. G06F 17/60

OTHER PUBLICATIONS

Terase, N. (2003). Is XML technology the next-generation internet communication standard? A study of leading-edge applications. (Order No. 3081605, Auburn University). ProQuest Dissertations and Theses, 291-291 p. Retrieved from http://search.proquest.com/docview/305341663?accountid=14753.*

(Continued)

*Primary Examiner* — Muriel Tinkler
(74) *Attorney, Agent, or Firm* — Brinks Gilson & Lione

(57) ABSTRACT

A system is configured to allow a business user to define insurance products based upon reusable product/offering definitions. The reusable product/offerings definitions may include reusable insurance based components and templates, which permit a business user of the software to develop and configure insurance products based upon a hierarchical set of insurance product components and insurance product templates. In addition, the system combines componentization, flexible granularity and reusable product structures to permit a user to more rapidly and predictably generate insurance product configurations and flexibly tailor the insurance products or offerings to meet a specific client or market need.

14 Claims, 24 Drawing Sheets

(56) References Cited

U.S. PATENT DOCUMENTS

| | | | |
|---|---|---|---|
| 2003/0233367 A1* | 12/2003 | Uluakar et al. | 707/102 |
| 2003/0233370 A1 | 12/2003 | Barabas et al. | 707/103 |
| 2004/0143464 A1 | 7/2004 | Houle et al. | 705/4 |
| 2004/0143646 A1 | 7/2004 | Klubertanz | 709/219 |
| 2005/0015283 A1 | 1/2005 | Iino et al. | 705/4 |
| 2005/0022171 A1 | 1/2005 | Langkafel et al. | 717/136 |
| 2005/0261953 A1 | 11/2005 | Malek et al. | 705/10 |
| 2006/0004612 A1 | 1/2006 | Chewning et al. | 705/4 |
| 2006/0100912 A1 | 5/2006 | Kumar et al. | |
| 2006/0106627 A1 | 5/2006 | Al-Nujaidi | 705/1 |
| 2006/0293928 A1 | 12/2006 | Schumacher et al. | 705/4 |
| 2007/0282666 A1 | 12/2007 | Afeyan et al. | 705/10 |
| 2008/0016099 A1 | 1/2008 | Ikeda | 707/102 |
| 2008/0168071 A1 | 7/2008 | Dykes et al. | |
| 2008/0319900 A1 | 12/2008 | Schiminovich | 705/40 |
| 2009/0012840 A1 | 1/2009 | Gaubatz et al. | 705/10 |
| 2009/0063275 A1 | 3/2009 | Barak | |
| 2009/0210259 A1 | 8/2009 | Cardot et al. | |
| 2010/0023355 A1 | 1/2010 | Sagalow et al. | |
| 2010/0223078 A1 | 9/2010 | Willis et al. | |

OTHER PUBLICATIONS

Watson, James Kells,, Jr. (2003). Organizational dissonance: A framework to study information technologies and customer relationship management. (Order No. 3098342, University of Illinois at Chicago). ProQuest Dissertations and Theses, 244-244 p. Retrieved from http://search.proquest.com/docview/305240627?accountid=14753.*

"Reader's Digest says Internet key to its future," Direct Marketing, Hoke Communications, Inc. 1999, pp. 1-2; HighBeam Research Dec. 3, 2011; URL: http://www.highbeam.com/doc/1G1-54710928.html.

Databases and Database Management Systems; Nov. 6, 2004; 6 pages—www.asiplease.net/computing/access/dbase.htm URL: http://web.archive.org/web/20041106221041/http://www.asiplease.net/computing/accerss/dbase.htm.

U.S. Office Action issued in U.S. Appl. No. 12/569,594, dated Dec. 12, 2011 (56 pgs.); U.S. Patent and Trademark Office, Alexandria, VA.

U.S. Office Action issued in U.S. Appl. No. 12/569,594, dated May 21, 2012 (77 pgs.); U.S. Patent and Trademark Office, Alexandria, VA.

U.S. Office Action issued in U.S. Appl. No. 12/569,678, dated May 24, 2012 (25 pgs.); U.S. Patent and Trademark Office, Alexandria, VA.

U.S. Office Action issued in U.S. Appl. No. 12/895,135, dated Mar. 26, 2012 (24 pgs.); U.S. Patent and Trademark Office, Alexandria, VA.

"CCSRL, SRP, NSRP, and WNSRP Protocols for 3G-324M on PowerQUICC Processors," by David Turvey; An3092, Rev. 0, Sep. 2006; Freescale Semiconductor Inc. 16 pgs.

U.S. Office Action issued in U.S. Appl. No. 12/895,135, dated Sep. 27, 2012 (42 pgs.); U.S. Patent and Trademark Office, Alexandria, VA.

U.S. Office Action issued in U.S. Appl. No. 12/569,594, dated Oct. 24, 2012 (68 pgs.); U.S. Patent and Trademark Office, Alexandria, VA.

Brostoff, Steven, "Technical snag in Medigap law is alarming insurers. (Omnibus Budget Reconciliation Act of 1990)," Nov. 18, 1991, pp. 1-3, National Underwriter Life & Health—Financial Services Edition, Nov. 1991, available at URL: http://www.highbeam.com/doc/1G1-11585329.html.

Office Action, dated May 8, 2013, pp. 1-85, U.S. Appl. No. 12/569,594, U.S. Patent and Trademark Office, Alexandria, Virginia.

Office Action, dated Nov. 21, 2012, pp. 1-23, U.S. Appl. No. 12/569,678, U.S. Patent and Trademark Office, Alexandria, Virginia.

Office Action, dated Nov. 21, 2012, pp. 1-43, U.S. Appl. No. 12/895,250, U.S. Patent and Trademark Office, Alexandria, Virginia.

Office Action, dated May 28, 2013, pp. 1-42, U.S. Appl. No. 12/895,250, U.S. Patent and Trademark Office, Alexandria, Virginia.

Office Action, dated Jan. 3, 2013, pp. 1-37, U.S. Appl. No. 12/895,135, U.S. Patent and Trademark Office, Alexandria, Virginia.

Office Action, dated Jun. 4, 2013, pp. 1-26, U.S. Appl. No. 12/895,135, U.S. Patent and Trademark Office, Alexandria, Virginia.

Notice of Allowance, dated Aug. 29, 2013, pp. 1-19, U.S. Appl. No. 12/895,135, U.S. Patent and Trademark Office, Alexandria, VA.

Notice of Allowance, dated Sep. 12, 2013, pp. 1-26, U.S. Appl. No. 12/895,250, U.S. Patent and Trademark Office, Alexandria, Virginia.

* cited by examiner

REUSABLE PRODUCT SYSTEM

PRIORITY

This application claims priority under 35 U.S.C. §119(e) to U.S. Provisional Application No. 61/101,608, entitled "REUSABLE PRODUCT SYSTEM," filed Sep. 30, 2008, the entire contents of which are hereby incorporated herein by reference.

This application also claims priority under 35 U.S.C. §119 (e) to U.S. Provisional Application No. 61/101,633, entitled "Adapter Services," filed Sep. 30, 2008.

RELATED APPLICATIONS

The present patent document is a commonly owned co-pending patent application of the application Ser. No. 12/569,594, filed Sep. 29, 2009, entitled "INSURANCE CONFIGURATION COMPONENTS," which is incorporated by reference in its entirety.

The present patent document is a commonly owned co-pending patent application of the application Ser. No. 12/569,678, filed Sep. 29, 2009, entitled "INSURANCE PRODUCT CONFIGURATION FACILITY AND DEVELOPMENT SYSTEM," which is incorporated by reference in its entirety.

RELATED APPLICATIONS

The present patent document is a commonly owned co-pending patent application of the application Ser. No. 12/331,689, filed Dec. 10, 2008, entitled "ADAPTER SERVICES," which is incorporated by reference in its entirety.

TECHNICAL FIELD

This application relates to systems for developing insurance products and offerings. In particular, this application relates to development of flexible and reusable components to permit business users to develop and configure insurance products.

BACKGROUND

In the insurance industry, insurance applications have been written that enable users, such as insurance policy salespeople, to sell insurance products. When an insurance company desires to sell a new insurance product, the existing insurance products fail to provide a flexible architecture to permit business users to develop and test insurance products/offerings, components of insurance products and offerings, or templates that describe portions of insurance products/offerings.

To compound the problem, insurance applications may be integrated with other applications that perform various features. For example, insurance applications may be integrated to enable customization of business processes. The integration between an insurance application and the other applications may be extensive and not easily changed.

BRIEF SUMMARY

As a first example, a business user may use a network-based system to develop an insurance product offering based upon reusable components. The system may include a server coupled to a network and configured to interact with one or more insurance component library database and an insurance product database. The insurance component library database may store a plurality of insurance components. The insurance product database may store a plurality of insurance product offerings. The server may also be configured to communicate with a plurality of configurable computational software engines.

The server may generate an insurance product development interface or portal to display, combine, and manipulate at least a portion of the insurance component library, receive selections of insurance components, and describe interrelationships between the insurance components. The insurance components may be assigned component relationship. The insurance product development interface or user portal may receive selections of rule types for each of the insurance component, where each rule type is associated with configurable content resident on one of the plurality of configurable software engines.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE DRAWINGS AND THE PRESENTLY PREFERRED EMBODIMENTS

Figure 1:
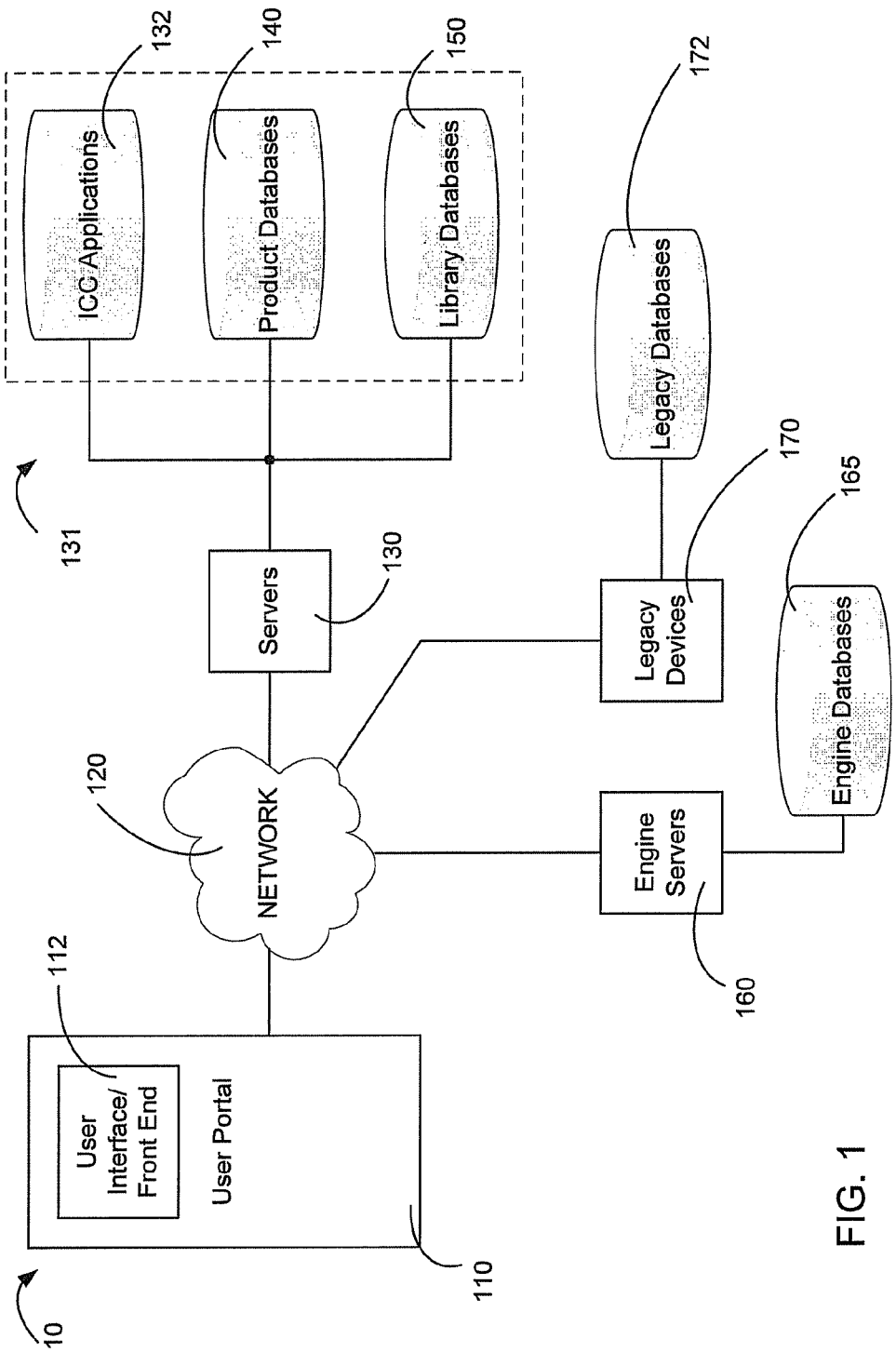
FIG. 1 depicts a system for developing reusable product definition structures.

FIG. 1 depicts an example system 10 for developing and using reusable product definition structures or components in the insurance industry. System 10 includes a user portal 110 having a user interface/front end 112. As an example, the user interface/front end 112 may be a graphical user interface. As another example, the user interface/front end 112 may be a web-based user interface. The user portal or terminal 110 is configured to communicate over a network 120.

The user portal or terminal 110 may be a computer, a handheld device, a pocket PC, a personal computer, or a work station. As used hereinafter, the user portal 110 may be referred to or used interchangeably with the terms terminal or work station. As an example, the user portal or workstation or terminal 110 may include one or more computer processors, controllers, or microcontrollers configured to execute software stored on a memory or hard drive. The user portal 110 may include random access memory, flash memory, a flash ROM interface, SRAM, hard drive, CD-ROM drive or any other data and instruction storage device. The user portal 110 may include a graphics circuit for generating a graphical user interface 112 on a display included in the user portal 110 or to an externally attached display. The user portal 110 may include an interactive screen to receive a selection via a stylus or pointing device. As an example, the user portal 110 may be a pocket PC or a tablet PC configured to receive an input via a touch screen graphical user interface.

The user portal 110 may include an operating system and various software applications and interfaces comprised of computer executable program code stored on a memory. The software applications and modules may include a web browser, network software, and wireless networking software. The software applications may interpret and interoperate with web-based protocols and languages including JAVA™, JAVA-script™, HTML, XML, MICROSOFT.net™, and Active-X®.

The user portal or terminal 110 may include a web-based user interface 112. In addition, the user portal or terminal 110 may include portal technologies and web-based application user interfaces. The user portal or terminal 110 may store information locally, remotely, or a combination thereof. In response to a user request via the user portal 110, the user portal 110 may request to store information, via a web-based operation, in the databases 131, associated with either the servers 130 or stored on other storage media connected to network 120.

The user interface 112 may provide a user a customizable view of a series of insurance components and the summary data of the insurance components. In response to the stimulus received by the user interface 112, the user portal 110 may make a request to the servers 130 for a portion of the data descriptive of an insurance component. The retrieved data may be displayed on user interface 112.

The network 120 may include a wireless network, a dedicated network, an Ethernet, the Internet, and/or other communication systems. The user portal 110 may communicate with the servers 130 through the network 120.

As a non-limiting example, the servers 130 may include a server, a cluster of database servers, computing devices, and a meta-computer system. Each server, cluster of database servers, computing device, and meta-computer system may include one or more processors coupled to one or more tangible memory devices or tangible computer readable media. The servers 130 may be located in a central region or location. Alternatively, the servers 130 may be distributed across a geographical area and interconnected by either private and/or public communication networks.

The servers 130 may include one or more computer processors, controllers, or microcontrollers configured to execute software stored on a memory or hard drive. The software may include computer executable program codes or instructions. The servers 130 may include random access memory, flash memory, a flash ROM interface, SRAM, hard drive, CD-ROM drive or any other forms of tangible storage medium. Servers 130 may include communication systems for communicating over communication networks. Servers 130 may include computer readable media to support a computer program product. The servers 130 may include one or more graphics circuits for generating a graphical user interface 112 on a display of the user portal 110 or to an externally attached display. The servers 130 may connect and operate with various network interfaces including wireless and landlines. As an example, the terminal 112 may communicate with the servers 130 over the network 120. The terminal 112 may interact with the servers 130 to develop an insurance product offering by sending an insurance product offering request to the servers 130.

The servers 130 may include an operating system and various software applications, modules, and interfaces that include computer executable program code or instructions. As a non-limiting example, the software applications, modules, and interfaces may include a user interface, database management software, web browsers, server side support software, remote access software, network software, and wireless networking software. As used herein, modules are defined as at least one of hardware, software, or a combination thereof. The servers 130 may further include support architectures such as architectures based on the .NET Framework™ that work in conjunction with various technologies including, for example, MICROSOFT® Windows Workflow Foundation (WF), MICROSOFT° Windows Communication Foundation (WCF), and MICROSOFT° Windows Presentation Foundation (WPF).

The servers 130 may include databases 131. Alternatively, servers 130 may access one or more databases 131 through various network systems 120. The databases 131 may include an ICC applications database 132, library databases 150, and product databases 140. The servers 130 may access legacy devices 170 and associated legacy databases 172. The servers 130 may access engine servers or computational engines 160 and engine databases 165.

Example databases may include a Relational Database Management System (RDBMS), an object-oriented database, an extensible markup language (XML) database, a file system, memory structures, and other now known or later developed data organization and storage mechanisms. Each database server may include a random access memory (RAM), a read-only memory (ROM), an erasable programmable read-only memory (EPROM), flash memory, optical memory, magnetic (hard-drive or tape) memory and other memory devices.

The engine servers or rules engines 160 may access engine databases 165 via networks or local storage. Engine servers 160 may include rule engines configured to process information and or claims associated with insurance products or offerings. Example rules engines 160 may include Blaze Advisor® engine, from Fair Isaac Corporation of Minnesota and Insbridge® Suite from Insbridge, Inc. of Texas. Another example of engine servers 160 may include the BLAZE software engine.

The legacy devices 170 may be configured to access legacy databases 172 via networks or local storage.

The servers 130 may support a remote method invocation (RMI). Using the RMI, the servers 130 may govern execution of component adapters on different processes or even on different devices connected over the network 120. In general, a component adapter may initiate operations on one or more engine objects resident in engine servers or computational engines 160 to maintain the hierarchical structure of the engine objects related to insurance components, insurance templates, and products, as discussed relative to the examples depicted in FIGS. 5-8 and FIGS. 11-12.

RMIs may include Simple Object Access Protocol (SOAP), Microsoft Component Object Model (COM), Microsoft Windows Communication Foundation (WCF), Common Object Requesting Broker Architecture (CORBA), and Java RMI. Thus, system 10 improves information technology resource optimization and leverages skills to develop and increase throughput in the insurance product development area.

System 10 implements a centralized rules-management utility on the servers 130 and user portal 110. A business user of the system 10 may access and extract business rules housed in legacy applications through the user portal 110 to enable efficient and effective underwriting, product development, and policy processing of insurance-related products. The legacy applications or functions may include legacy policy systems stored in the legacy database 172. Legacy applications may include creation of forms, scheduling, process flow application, and insurance product deployment platforms.

System 10 wraps legacy functions and devices 170 into an optimized core transaction processing system. System 10 decouples and wraps legacy functions to isolate and componentize functionality and centralize data access and business rules management.

System 10 provides incremental legacy system replacement with smaller implementations and shorter time frames. System 10 further allows the user to develop, optimize, test, and deploy new insurance products. System 10 may include externalized rules that allow the business users to specify, outline, define, or implement products, underwriting, and business processes.

System 10 allows for product componentization and assembly through reusable product structures. The product componentization allows system 10 to develop insurance products with a desired level of granularity. System 10 may combine componentization of insurance products/offerings, flexible granularity, and reusable product structures.

The componentization, flexible granularity, and reusable product templates and structures permits rapid and predictable development and deployment of insurance product configurations. Insurance product templates, or templates, may include hierarchically arranged and predetermined relationships between insurance product components that describe or specify some portion of an insurance product/offering or line of business. System 10 may include flexible tailoring of insurance products or offerings to meet a specific client or market need without substantial reconfiguration of information systems or revision of software services, data storage and configurations, or user interfaces. Example insurance products or products may include insurance for a loss related to a property, a business, a home, a car, or a life. Insurance products may also include an umbrella or general casualty coverage. Insurance offerings may include combinations of various types of individual insurance products or a rider on an insurance product.

System 10 may improve integration of disparate legacy applications and promote or provide centralized rules management and standardization of data definitions. Centralized rules management and standardization of data definitions may allow System 10 to mask inconsistencies in different applications and legacy devices 170.

System 10 may include conversion and assimilation of best of breed components. System 10 may include a rules engine implemented on the engine servers 160. The conversion and assimilation of components may be implemented through predefined adapters that provide well-defined functional encapsulation. As an example, engines 160 may pass instructions and data and be controlled through, well-defined functional encapsulation and predefined adapters. The servers 130 may communicate with various component adapters. Servers 130 may include processors to execute computer code in a process to make a procedure call to a component adapter interoperated within the ICC functionalities resident on the servers 130.

A component adapter may be either a synchronous or an asynchronous adapter to interface between the functionality and respective configurable engines. During operation, the component adapter may handle communications between one or more application and objects within the configurable engines of engine servers 160. The component adapter may initiate the creation, deletion, versioning, or deployment of engine objects which may be instantiated on the configurable engine servers 160 in response to the respective creation, deletion, version, or deployment of a component of an ICC application. Two program objects may be integrated if one or more operations applied to a first program object will also be applied to the second program object. The component adapter may receive commands from the ICC design and configuration environment 230 executed on the servers 130.

Figure 2:
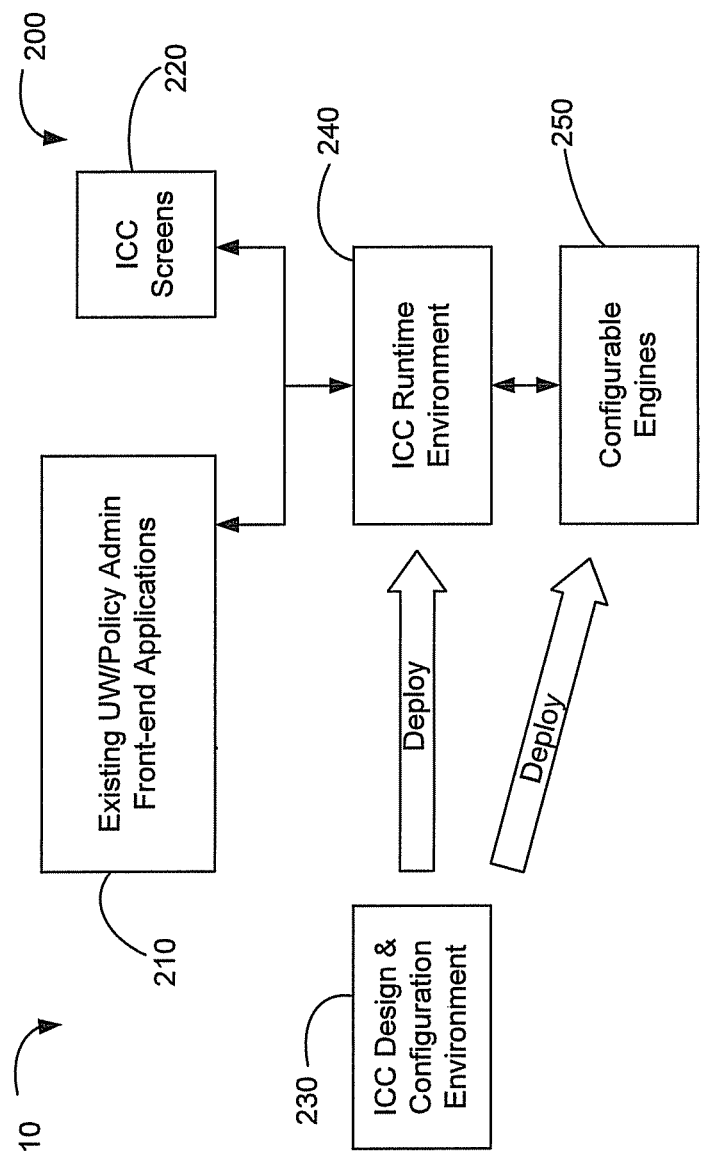
FIG. 2 depicts a high level architecture of an Insurance Configuration Component (ICC) system included in the system of FIG. 1.

In FIG. 2, an example Insurance Configuration Component (ICC) 200 executable on servers 130 and interacted with via user portal 110 is described with continuing reference to FIG. 1. The ICC Architecture 200 may include software and communication technologies. The ICC Architecture 200 may include web-based software components instantiated on the servers 130. Accordingly, the business user of the user portal 110 may access the functionality of the ICC Architecture 200 via a web-based user interface/front end 112.

Accordingly, as used herein, a business user may be defined as a person or organization assigned to develop insurance products for deployment into an insurance market.

The ICC Architecture 200 may include existing Underwriting and Policy Administration (UW/PA) Front-End Applications 210. The existing UW/PA Front-End Applications 210 may include legacy systems such as PA, AMS, portals, Point of Service (POS), underwriting (UW) desktops, or any other legacy systems already deployed by an insurance provider. An insurance provider may use the ICC Architecture 200 to seamlessly interact with both an existing rules engine with a new underwriting engine.

The ICC screens 220 may provide user interface screens to support the policy runtime environment 210 in the ICC design and configuration environment 230. The ICC screens 220 may include user interface screens displayable on the user portal 110. The ICC design and configuration environment 230 may be used to develop, test, and deploy various insurance products. The ICC design and configuration environment 230 may allow users to modify core product definitions and rules governing insurance products or offerings in a consistent format.

In general, a core product definition may be a product that is typical of most insurance products or offerings. As an example, a coverage insurance component may be part of a core product definition. A core product rule may include a set of rules that determine the amount of insurance premium associated with an insurance policy or coverage. In addition, the ICC design and configuration environment 230 may also provide an abstraction layer for software components and component adapters, which insulate business users from the underlying technology utilized by the ICC design and configuration environment 230.

The ICC screens 220 displayed on the user interface 112 may provide an ICC runtime environment 240. Prior to deployment of an insurance product or rule, a business user may use the ICC runtime environment 240 to test the core product definitions and rules using predetermined models and data. The ICC runtime environment 240 may componentize the key underwriter and policy administrating capabilities of in-place legacy systems and develop components for use in new systems and/or subsystems. The ICC runtime environment 240 may interact with configurable engines 250. The configurable engines 250 may include ratings, underwriting rules extraction, forms generation, and data gathering functionalities or applications. The configurable engines 250 may be local to servers 130 or located remotely on engine servers 160 or legacy devices 170.

The ICC Architecture 200 may include configurable engines 250. The configurable engines 250 may include executable programs stored in the engine database 165. The configurable engines 250 may execute on engine servers 160. Configurable engines 250 may include hardware or software functionality implemented on or with legacy devices 170 and stored in legacy database 172. Alternatively, configurable engines 250 may include executable program code or data stored on servers, which may be accessed by the configurable engine 250 through network 120.

The configurable engines 250 may be accessed and controlled through component adapters configured to interface with a particular configurable engine 250. The component adapters provide an adaptation or abstraction layer of service to insulate the business user from the underlying functionality of the configurable engines 250. The component adapters may include computer executable program code, instructions, or web-based functions. The component adapters and other related services may be implemented in software stored in the memory associated with the ICC applications database 132. Some component adapters may be stored in the engine databases 165 and legacy databases 172. The ICC Architecture 200 may provide insurance based tool packages to provide business users with the functionality of these components.

Figure 3:
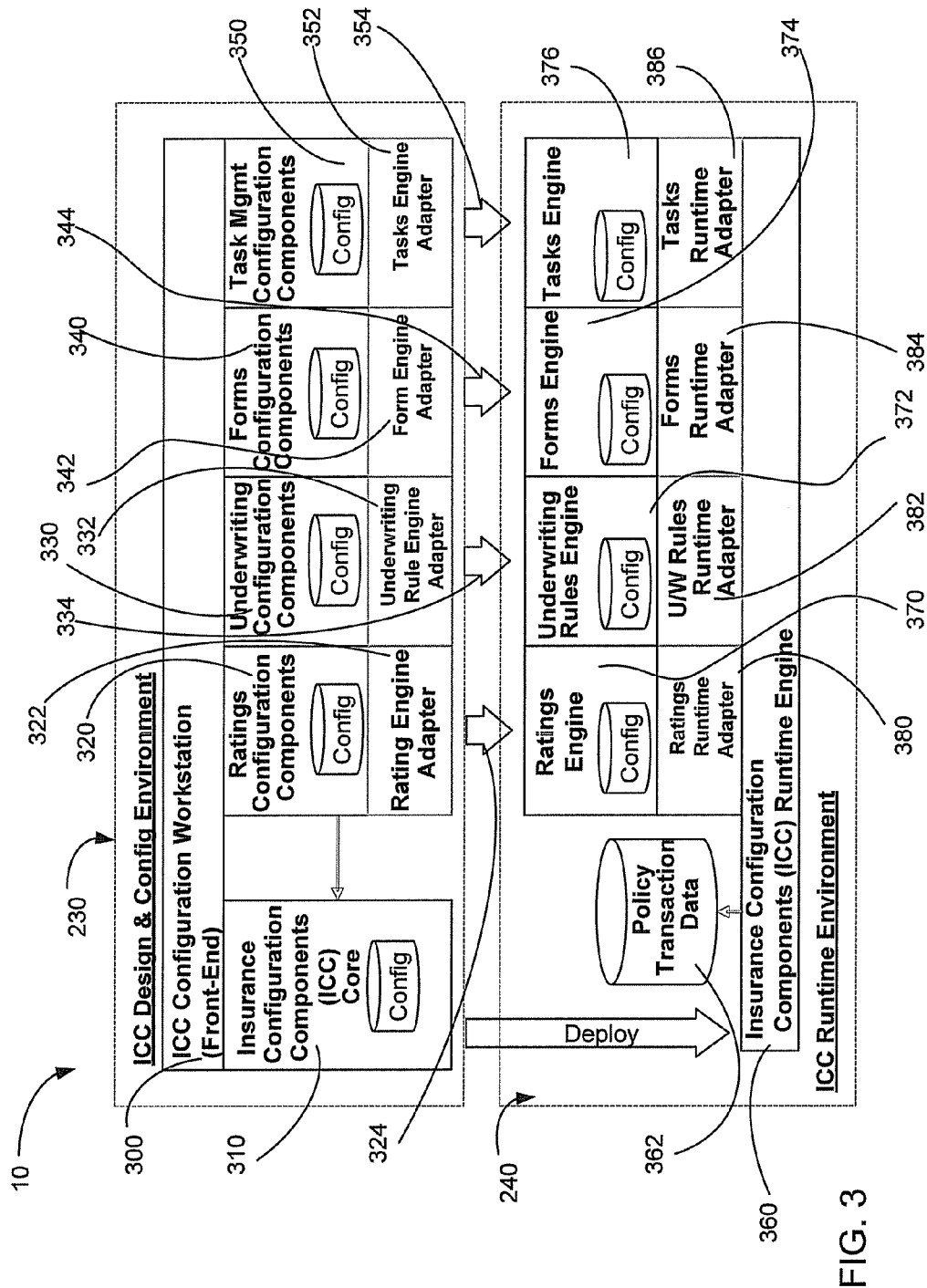
FIG. 3 depicts an example interrelationship between the ICC design and configuration environment and the ICC runtime environment shown in FIG. 2.

In FIG. 3, an example system 10 includes software modules associated with one example of the ICC design and configuration environment 230 and ICC runtime environment 240. In FIG. 3, with continuing reference to FIGS. 1-2, the ICC design and configuration environment 230 includes software modules stored in the ICC applications database 132 for an ICC configuration workstation front end 300 that is displayed on the user portal 110. The ICC configuration workstation front end 300 may be displayed with, on, or through the user interface/front end 112.

The ICC design and configuration environment 230 may include an ICC configuration workstation front end 300. The ICC configuration workstation front end 300 may be a web-based application or a standalone software application. The ICC configuration workstation front end 300 may enable business users to configure the system 10. The ICC configuration workstation front end 300 may further include web-based user interface information configured to be displayed on the user interface 112 of the user portal 110.

The ICC configuration workstation front end 300 may permit business users to modify the behavior and/or configuration of capabilities of other related elements in the system 10. Business users may use the ICC configuration workstation front end 300 to configure the behavior of functions related to ratings of insurance risk and policies, underwriting assessments, forms generation and population, and tasks management. The ICC configuration workstation front end 300 may include interoperability with third-party tool providers.

The ICC design and configuration environment 230 may include an Insurance Configuration Component (ICC) core 310 configured to support flexible product definitions and product-level edits. Product definitions may include combinations of lines of business, coverages, sub-coverages, and other insurance product components. A product-level edit may include functionality to modify a product definition by selectively replacing portions of the insurance product components, rule types, relationships between the insurance product components, or attributes assigned to insurance product components through the ICC configuration workstation front end 300. The ICC core 310 may include computer executable program modules and web-based modules, programs, applets, and web pages stored in the ICC applications database 132 that are accessible by the servers 130 through network 120.

The ICC core 310 may be configured to provide or implement the overall process, transaction flows, and acts to develop insurance products or offerings. The ICC core 310 may further include user interface screens stored in the ICC application database 132 to capture data functions and specify user roles and privileges. The data may be displayed on the user interface 112 of user portal 110.

ICC core 310 may support insurance product development, insurance product project management, organizational and security management, access to products, offerings, information, libraries, and ICC reference data. ICC reference data may include valid lists and code or state values. The ICC reference data may be used to verify attributes, associations between insurance templates and components, and rule types for each specified insurance component.

The ICC design and configuration environment 230 may also support software components stored in the ICC applications database 132 or servers 130. The ICC design and configuration environment 230 may further include a rating configuration component 320, an underwriting configuration component 330, a forms configuration component 340, and a task management component 350.

The rating configuration components 320 may interface with ratings engine component adapters 322, and support definitions of rating rules in a generic format. The ratings rules for an insurance product or offering may be associated with specific insurance rating decisions. The rating rules may include insurance risk of loss ratings information. The ratings information may include cost, loss, and risk attributes associated with an insurable event. The ratings rules may provide a linkage between determining differentials and rules for a given risk. The ratings rules may be adapted based upon changing business needs and risk environments.

The ratings configuration components 320 may publish the rating rules to ratings engines via ratings engine component adapters 322. The product definitions provided by the ICC core 310 allow business users to specify insurance products without redefining the data structures associated with ratings engines.

The underwriting configuration components 330 support the creation and the definition of underwriting rules and scoring for an insurance product in a generic format. The underwriting rules may determine the eligibility of a customer to purchase an insurance product or offering based upon business-related factors.

In addition, the granularity of the insurance product definition may permit the underwriting configuration components 330 to support underwriting rules and scoring of a component of an insurance product. The underwriting configuration components 330 publish these rules to rules engines via underwriting rules engine component adapter 330 without the need to redefine the data structures.

The form configuration components 340 support definition of policy forms and documents. The forms configuration component 340 publishes rules to document generation engines, via forms engine component adapters 342.

The task management configuration components 350 support definition of task and workflow rules. The task management configuration component 350 publishes rules to industry leading tasks and workflow engines via task engine adapters 352. This permits users of the ICC configuration workstation to use the product definitions without the need to redefine the data structures to enable flexible task generation.

The ICC runtime environment 240 may include one or more configurable engines. The ICC runtime environment 240 may include a ratings engine 370, an underwriting rules engine 372, a forms engine 374, and a tasks engine 376.

The ratings engine 370 may be configured to make rating decisions based on rates, determined differentials, and rules for a given risk. The ratings engine may adapt to changing business needs and risk environments.

The underwriting engine 372 may be configured to assess the eligibility of a customer to receive an insurance product or offering. Insurance underwriting may include assessing the eligibility of a customer or potential customer to purchase an insurance product or offering and setting prices based upon the risk of loss associated with the insurance product or offering.

The forms engine 374 may generate forms for display through ICC configuration workstation front end 300 on user interface 112. The data may be accessed by the user portal 110 and viewed on the user interface/front end 112. Data and information may be reviewed, entered, or modified via the user interface/front end 112. Forms engine 374 may include server tools to create dynamic web data entry forms to receive information or data related to an insurance product or offering. The task engine 376 may communicate with task scheduler services. The task engine 376 may identify resources to track the development process of an insurance product, offering, or components.

The ratings engine 370 may oversee runtime interactions between legacy applications, ICC engines, and any ICC generated screens or flows. The ratings engine 370 communicates with an ICC runtime engine 360 via the ratings runtime adapter 380. In the event that the policy data is required to support transactions between the ratings engine 370 and ICC runtime engine 360, but is not present in a legacy system, the ICC runtime environment 240 may be configured to store the data related to the legacy system internally. The ratings engine runtime component adapter 380 provides a runtime interface between the ICC runtime engine 360 and the ratings engine 370. The runtime component adapter 380 interacts with the rating engine adapter 322 via link 324 to perform data mapping and technical integration with each rating engine 370.

The underwriting rules engine runtime component adapter 380 provides a runtime interface between the ICC runtime engine 360 and the underwriting rules engine 372. The underwriting rules runtime component adapter 382 provides data mapping and technical integration with each underwriting rules engine 372.

The forms engine runtime component adapter 384 provides a runtime interface between the ICC runtime engine 360 and the forms engine 374. The forms runtime component adapter 384 performs data mapping and technical integration with the forms engine 374. The forms engine runtime component adapter 384 may include user oriented interfaces to support the forms selection operation.

The task engine runtime component adapter 376 provides the runtime interface between the ICC runtime engine 360 and the task engine 376. The task runtime component adapter 386 maps data and integrates with the task engine 376. The ICC runtime engine 360 may access policy transaction data 362. The policy transaction data 362 may be stored on servers 130, legacy device 170, or in network accessible databases 132, 140, and 150.

Figure 4:
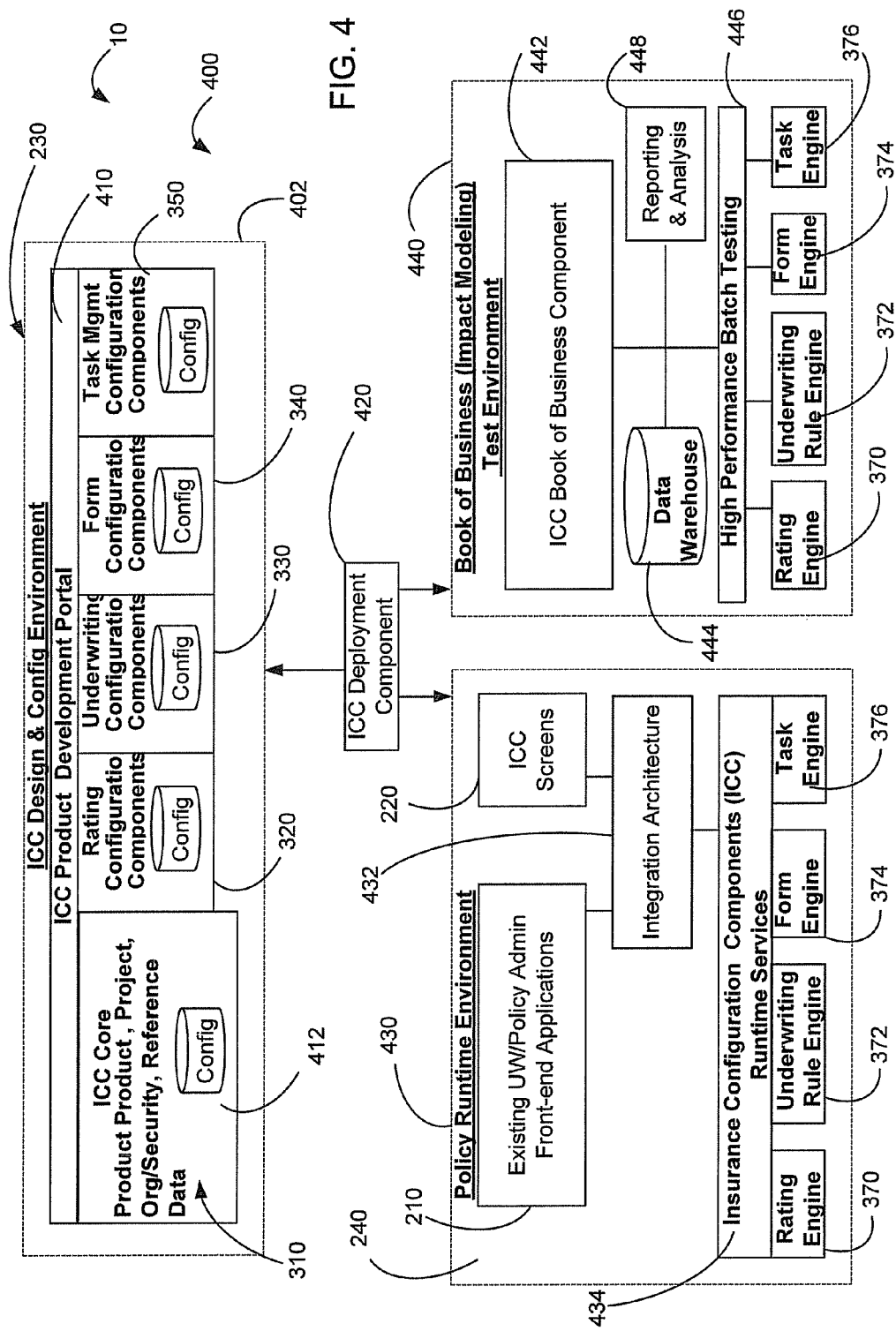
FIG. 4 depicts the relationship between the ICC design and configuration environment, a policy runtime environment, and a book of business (impact modeling) test environment.

With continuing reference to the examples depicted in FIGS. 1-2 and 4, the ICC configuration workstation front end 300 may allow business users to access, modify, and configure ICC core product data definitions resident in the ICC configuration component core 310. The core product data definitions specify the structures and attributes associated with the insurance product to be deployed or tested in the ICC runtime environment 360. The business users may also configure componentized ICC capabilities associated with the ratings configuration component 320, the underwriting configuration component 330, the forms configuration component 340, and the task management configuration component 350.

The business users and information technology users may configure the ICC transactions and screen/flows. Business users and information technology users may also use the ICC core 310 to configure calls to the componentized ICC capabilities including ratings configurations, underwriting configurations, forms configurations, and task management configurations When an insurance product is deployed, information technology users deploy the ICC configuration to an appropriate runtime component. The information technology users may also implement any additional integration required by ICC transactions to integrate the ICC configuration workstation 310 with legacy policy administrations (not depicted), legacy devices 170, or engine servers 160.

In FIG. 3, the ratings configuration component 320 communicates with the ratings engine component adapter 322. The ratings engine component adapter 322 may communicate via network 120 to engine servers 160 to access and control ratings engine 370. The ratings engine component adapter 322 may include a configurable web-based addressing format or link 324 that corresponds to configurable logic or memory in one of the engine servers 160 or engine database 165 to transfer information or request for services.

Configurable web-based addressing format or link 324 may include a network or web-based designator or link. The web or network-based designator may be one or more of a network address, an internet address, a Universal Resource Locator (URL), Hypertext Transfer Protocol (HTTP), Secure Hypertext Transfer Protocol (HTTPS), or other link or data-link address that corresponds to the configurable logic or memory in one of the engine servers 160 or the engine database 165.

The underwriting configuration component 330 may interoperate with the underwriting rules engine component adapter 332. The underwriting rules engine component adapter 332 may include a configurable web-based addressing format or line 334 that corresponds to configurable logic or memory in the underwriting rules engine 372.

In response to a service request from the underwriting configuration component 330, the underwriting rules engine component adapter 332 identifies one of the engine servers 160 responsible for executing software to implement the underwriting rules engine 372. The underwriting rules engine component adapter 332 encapsulates a service request in a message to be passed through the network 120 to the identified one of the engine servers 160 responsible for executing the underwriting rules engine 372. The underwriting rules engine component adapter 332 may receive responses from the identified engine servers 160 and pass return values, results, or messages to the corresponding underwriting configuration component 330.

The forms configuration component 340 may co-operate with a forms engine component adapter 342 to interface with forms engine 374 based upon a configurable web-based addressing format or link 344. The configurable web-based addressing format or link 344 may correspond to configurable logic or memory in engine database 165 or the forms engine 374. Accordingly, the forms engine component adapter 344 may communicate through the network 120 with forms engine 374.

The task management configuration component 350 interoperates with the task engine component adapter 352 to enable communication between the task configuration component 350 and task engine component adapter 352. The task engine component adapter 352 may include configurable web-based addressing format or link 354 that identifies a configurable logic or a memory in the tasks engines 376 or the engine database 165.

In FIG. 4, an example of the system deployment 400 includes an example of the ICC design and configuration environment 230 and configuration environment 402. With continuing reference to the examples depicted in FIGS. 1-3, in FIG. 4, the system deployment 400 includes a design and configuration environment 230, a runtime policy environment 430, and a book of business (impact modeling) test environment 440.

The ICC design and configuration environment 402 includes an ICC product development portal 410. The ICC product development portal 410 provides a user interface displayable on the user portal 110. The ICC product development portal 410 provides a control and abstraction layer between the user interface of the ICC product development portal 410 and the underlying functionality of the ICC design and configuration environment 230.

The ICC design and configuration environment 402 also includes an example of the ICC core 310, as ICC core 412. ICC core 412 may include software modules executable on servers 130 to allow the user of the ICC design and configuration environment to develop insurance products and offerings, manage insurance-related product development projects, manage organizational and security-based project and product-related issues, and store and retrieve reference data associated with the ICC core applications. The ICC core software modules may also include links to or generate user interface information to be displayed on the user portal 110 by the ICC product development portal 410. The ICC core application may generate web-based user interfaces with links to the servers 130.

ICC core 412 may include an ICC core project organization/security reference data. Business users may access the ICC product development portal through the web-based user interface 112 to configure ICC core product and data definitions.

A business user or information technology user of system 10 may also configure projects, organization/security, and reference data through the ICC product development portal. The ICC product development portal 410 may configure the componentized ICC capabilities including the ratings configuration component 320, the underwriting configuration component 330, the forms configuration component 340, and the task management configuration component 350 information.

System 10 further includes ICC deployment component 420. Typically, the ICC deployment component 420 may be configured by information technology users. When configured, the ICC deployment component 420 enables deployment of ICC configurations to appropriate runtime components, as will be described.

An information technology user may implement the additional integration required to support ICC transactions, integration with legacy policies, administration support policies, policy runtime environments, and book of business or impact modeling. In particular, the ICC deployment component 420 provides for message passing and data encapsulation to interface the ICC design and configuration environment 230 to the runtime policy environment 430 and book of business test environment 440.

In FIG. 4, an example ICC runtime environment 240 is similar to the policy runtime environment 430. The policy runtime environment 430 may include existing underwriting/policy administering applications 210 and ICC screens 220. The existing underwriting/policy administering applications may include legacy, AMS, AMS.NET, portal, POS, and underwriting desktops.

The policy runtime environment 430 may include ICC screens that are integrated with ICC runtime services 434 via an integration architecture 432. The integration architecture may include ESB, EIA, and BPM. The ICC runtime services 434 may provide an interface to the rating engine 370, UW rules engine 372, forms engine 374, and tasks engine 376.

The user interface 112 may be configured to display the ICC product development portal 410. The ICC product development portal 410 may specify product definitions, rules, forms, and tasks that are imported to the policy runtime environment 430 during deployment of the insurance product. By invoking the runtime policy environment, the business user may deploy insurance products or offerings into a test environment for validation of the design. Product information stored in the databases associated with the ICC core 310 may be extracted and deployed in coordination with the ICC deployment component 420.

Executing out of the servers 130, the policy runtime environment 430 links the structures and associated attributes, which specify the insurance product or core, through the integration architecture 432 to the ICC runtime services 434. The ICC runtime services 434 interacts with the ICC runtime engine 360 to communicate data and results between the configurable runtime engines 370, 372, 374, and 376. Results associated with the test deployment are returned to the ICC runtime services 434, which provide the results to either the existing UW/policy administration front-end applications or ICC screens for display. Results are passed through the ICC deployment component 420 to the ICC product development portal for review on the user portal 110.

The book of business impact modeling test environment 440 includes an ICC book of business component 442. The ICC book of business component 442 includes software modules executable on servers 130 to provide a test environment for verifying and modeling insurance products and offerings. The ICC book of business component provides services, integration, and user interfaces for configuration and management during testing and/or modeling of new, modified, or existing insurance products or offerings. The ICC book of business component 442 may include an interface to a data warehouse 444, a high-performance data batch testing component 446, and a reporting and analysis component 448.

In FIG. 4, an example high-performance batch testing component 446 allows testing of product components on the rating engines 370, the UW rules engine 372, the forms engine 374, and the tasks engine 376 prior to deployment of an insurance product.

The high-performance batch testing component 446 and book of business impact modeling test environment 440 analyze the effect of different rules, ratings, forms, and tasks on the business performance of a proposed insurance product before deployment or sale of the insurance product. For example, a business user may use the ICC product development portal 410 to specify insurance products, account hierarchies, and user roles. The business user may invoke the high-performance batch testing 446 using data stored in the data warehouse 444. During execution, the reporting and analysis module 448 collect designated information to develop reports and capture analytic results to predict commercial performance of the proposed product.

Business users may use the ICC product development portal 410 to relate the account hierarchy to product definitions or previously specified products. The ratings configuration components 320 may provide a business user with an interface to specify or develop rating rules to govern a new product.

The ICC product development portal 410 may include an interface to the rating configuration components 320 for defining underwriting rules and input underwriting rules for new or existing products.

The ICC product development portal 410 may interface with form configuration components 340 to develop form rules and receive the form rules. The ICC product development portal 410 may interface with the task management configuration component 350 to develop task rules and to input task rules.

The business user may launch the ICC deployment component 420 to invoke the book of business test environment 440 in order to test the new rules. The business user may also utilize the ICC product development portal 410 to deploy the rules/product definitions to the runtime environment 430.

The reuse of insurance product components and templates may allow a business user to create a new product or offering with a familiar or known quality. The use of templates advantageously allows a business user to develop an insurance product or offering without the need to create new component parts from scratch.

Figure 5:
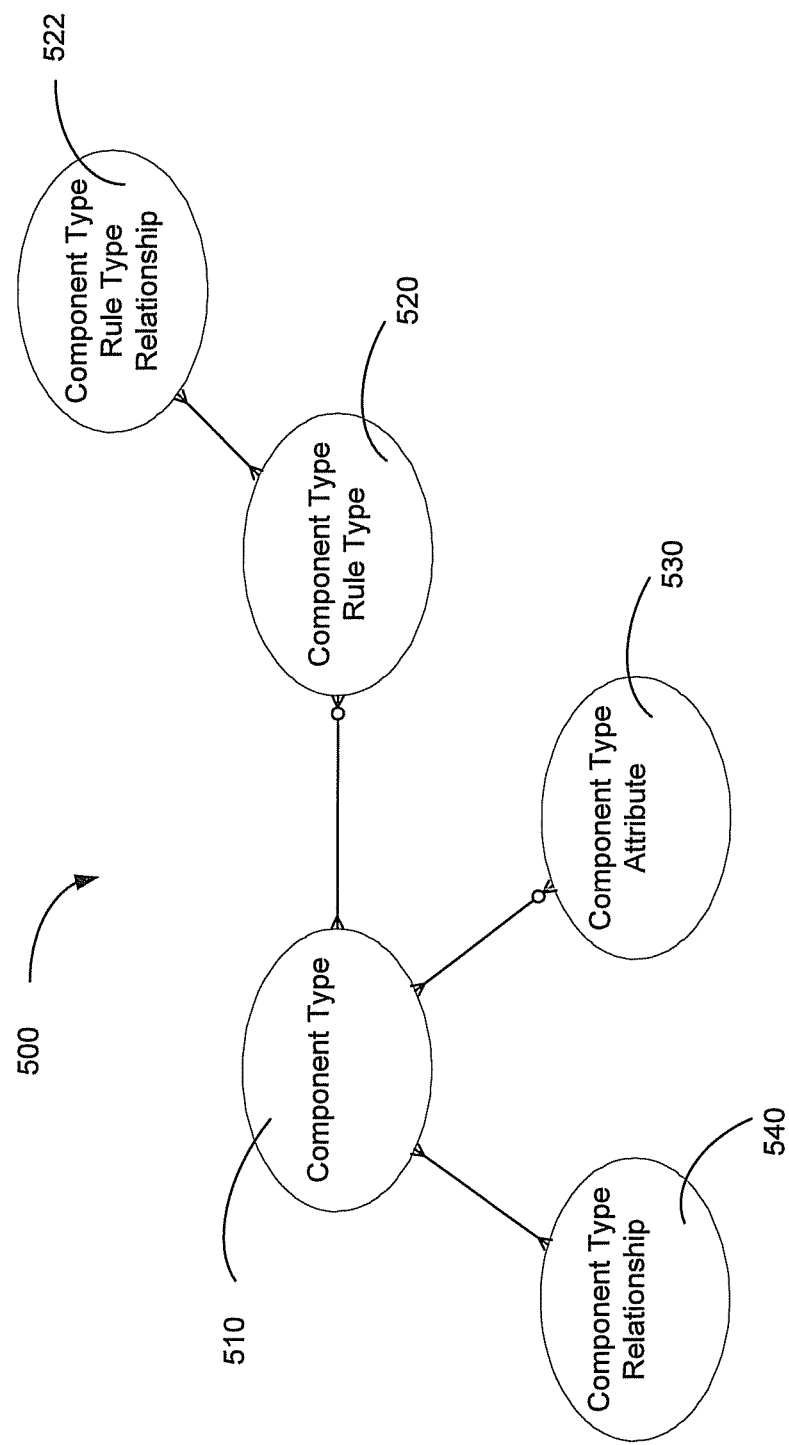
FIG. 5 depicts a component type table.

In FIG. 5, an example database includes database tables 500 configured to provide the ability to represent one or more insurance product components. The database tables 500 may be used to flexibly and selectively implement various insurance product components. In FIGS. 5-8, insurance products/offerings or templates for insurance products/offerings may be developed by specifying hierarchical relationships between components within the branches, such as rule sets.

The component type tables 500 may include a component type table 510 to develop different types of components. Examples of component types may include an insurance product/offering, line of business, coverage, or rule. Entries in the component type table 510 may describe a particular component type as a product component, a line of business component, or a coverage component. Component types may have associated rule types which describe the types of rules that may be related to a component type.

The rule types table 522 supports a hierarchy of rule types associated to a component type. Rule types may also have related rule types table 522. A rule type may also include rule sub-types or rule sub-sub types. The user interface/front end 112 may display a rule type window. As an example, the rule type window may display a rule type "underwriting" and ratings. The rule type window may display sub-rule types "financials," "eligibility," and "risk assessment," under the rule type "underwriting." The rule type window may display the sub-sub-rule types "credit" and "bankruptcy" under the sub-rule type "financials."

The component type table 510 may be associated with a component type rule types table 520, a component type attributes table 530, and component type relationships table 540.

The component type table 510 may include a data structure within a database. The component type table 510 may include attributes and functionalities in 520 to develop the operation and parameters of corresponding component types. The component type rule types table 520 may include a data structure to associate the component type to information related to the rule type. Entries in the component type rule types table 520 may include a list of rule types, types of rules associated with the rule, and dates that the rule types were identified. The component type rule types table 520 may be limited to receive predetermined valid rule types.

The information in the component type rule types table 520 may be used by component adapters to communicate with one of the engine servers 160. The component adapters are predefined adapters that provide well-defined functional encapsulation for each of the engines. Servers 160 may be utilized to test and deploy each insurance component or product depending upon the component type used to form an insurance product component. Each component adapter may map attributes, functions, and information for each insurance product component to the databases or configurable logic associated with one or more configurable engines 250.

The ratings runtime adapter 380 may access the component rule types table 520 of each component to determine the rules to be applied to the instantiated component type in an insurance product component. The ratings runtime adapter 380 may map the component rule types table entries to an appropriate memory structure in the ratings engine 370.

In other words, the component type rule types tables serve to provide a superset of rule types that may be selected when configuring an insurance product component. The adapters will be configured based upon the rule types associated to each component type. However, the adapters will access the component rule types to determine which rules should be applied for a given instantiated component.

Each component adapter may further include a table or structure within a database to associate the component to attributes and links to other databases or configurable logic associated with the configurable engines 260. The engine servers 160 may execute the configurable engines 260. In some examples of system 10, the component adapters may include attributes or links to a component rule types relationship table.

For example, the valid rule types related to component type "coverage" may be premium, group 1, and group 2. The exhaustive list of the rule types and the n-layers of rule type hierarchy related to each component type specifies what is available to the business user when creating, configuring, managing, or maintaining an instance of a product/offering component.

Examples of valid rule types may include rating rules, underwriting rules, form rules and task rules. Examples of valid sub-types of underwriting rules, risk analysis rules, catastrophe rules, and financial rules. Examples of valid sub-types of rating rules may include base rating rules, premium discount rules, and final rating rules.

A rule type table 520 may include tables or structures within a database to specify a classification of similar business rules focused upon a theme of insurance product functionalities. For example, a rule type table 1720 may be based around a common underwriting or rating theme. In addition, the rule type table 520 may include levels of hierarchical classification. As an example, the rule type table 520 may be configured as sub-rules types and sub-sub-rule types.

The database structure of each component type rule types table 520 may be configured as a single physical table that is logically partitioned. In other examples, the database structure of the component type rule types table 520 may include separate tables that are linked. In addition, the data base structure of each component type may include a configurable addressing format or link 324 that corresponds to configurable logic or memory in one of the engine servers 160 or engine databases 165 to transfer information or a request for services.

As an alternative example, the component type rule types table 520 may include a table or structure within a database to associate a component based upon the component type to attributes and links to other databases or configurable logic associated with the configurable engines 260. In addition, the component type rule types table 520 may include attributes or links to a component type rule type relationship table 522.

The entries in the tables or database structures that describe the component type rule types table 520 may be a configurable addressing format or link 324. The component type rule types table 520 or a database structure of each rule type table 520 may include a network address, an Internet address, a Universal Resource Locator (URL), Hypertext Transfer Protocol (HTTP), Secure Hypertext Transfer Protocol (HTTPS), or other network or data-link address that corresponds to the configurable logic or memory in one of the engine servers 160 or the engine database 165.

The component type attributes table 530 may include tables or structures within a database to specify the available attributes for each component type. The tables of the component type attributes table 530 may include definitions of valid attribute values for a given component type table 510. Attributes include a deductible type, a co-insurance amount, or a limit amount.

Figure 6:
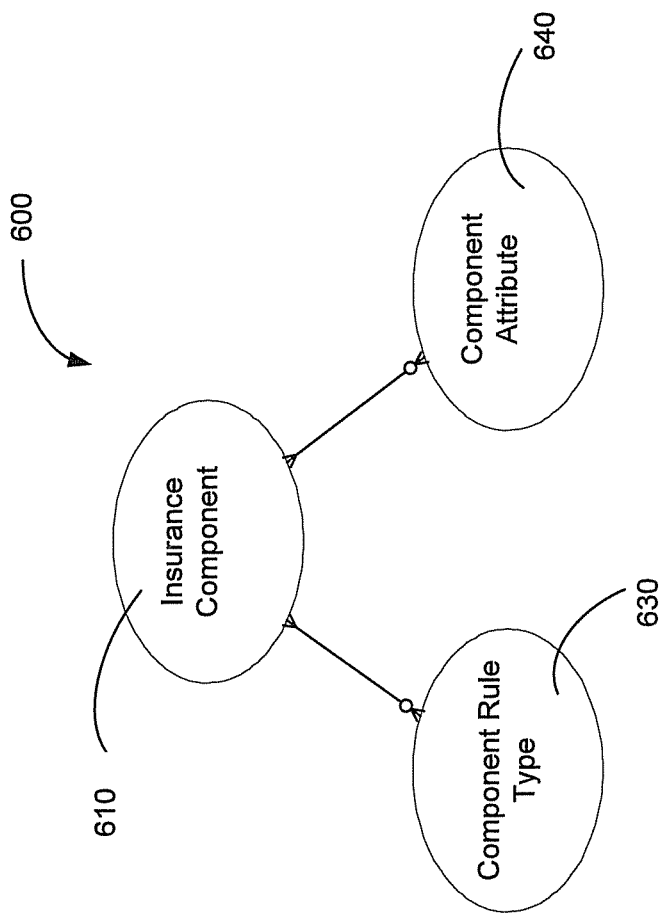
FIG. 6 depicts a reusable insurance component of a component library.
Figure 7:
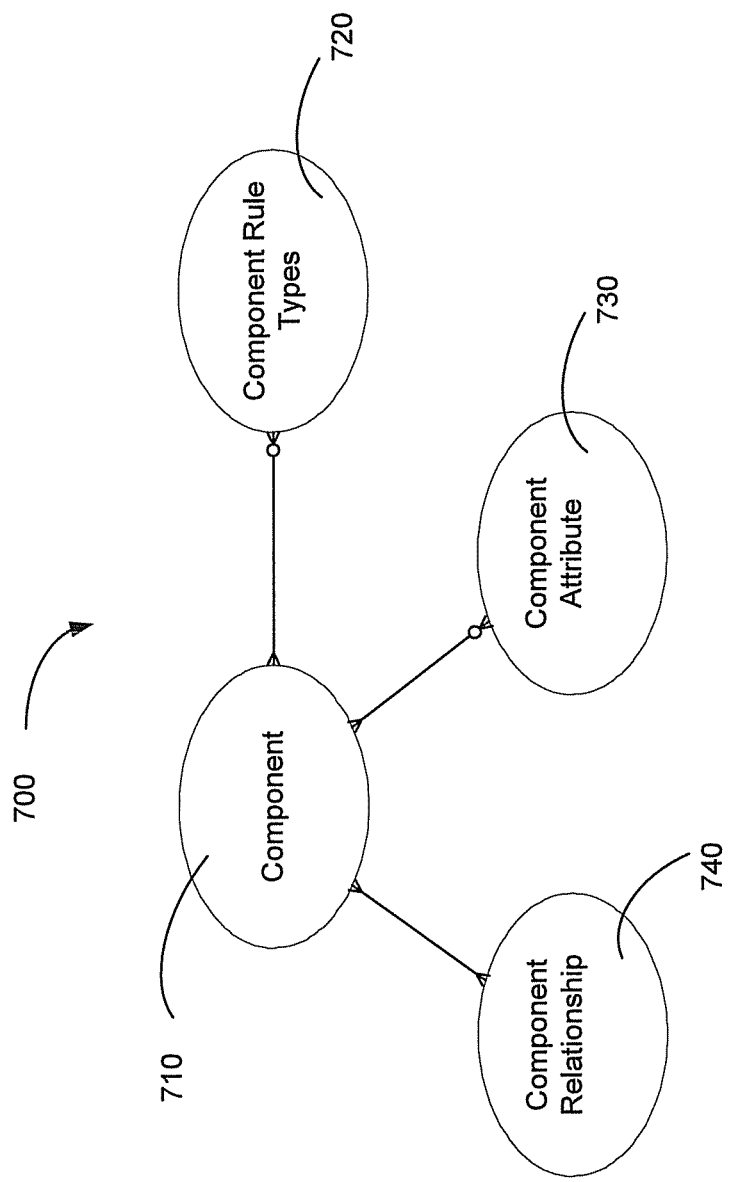
FIG. 7 depicts the relationships used to form a product or offering structure.

In FIGS. 6 and 7, an example of the product system components in FIG. 5 may be used to create and manage the components, the templates, and the product/offerings based upon the entry of attributes and establishment of relationships and rules/rule types contained within the various and respective component tables.

The component type table 500 and the corresponding component type relationships table 540 may include a table of entries to relate the component types table 510 to other component types. The component type relationships table 540 may specify the configuration that governs the hierarchical structure of the product/offering as illustrated in FIG. 8B, as a product tree or product definition 842. Illustratively, as shown in FIG. 5 the component type relationships table 540 may specify the relationship of a component type to another component type or to an insurance product template comprising a plurality of previously related or developed components.

Some example component types may describe a portion of a product BOP 832, a line of business 834, and/or coverage 836. For example, the component type relationships table 540 may create relationships between a product BOP 832 and a line of business 834. To form a hierarchical relationship between the first insurance component and a second insurance component, the server 130 stores, in the component type table of each component, the relationship of the respective component types associated each respective component 1 and component 2.

As an example, the servers 130 may create hierarchical relationship between a first insurance component and a second insurance component by storing relationship information in the component relationship tables of the first insurance component and the second insurance component. The relationship information associates the first insurance component to the second insurance component. The framework or structure of the insurance product offering is based upon the content of the respective component relationship tables.

A product component type may have many lines of business component types. Likewise, the component type relationships table 540 may also create relationships between a line of business component type 834 such that a line of business component type 834 may have many coverage component types 836 and 828. The component type attribute table 530 may relate a list of values that may be used in configuring each component type table 510. As a non-limiting example, the coverage component type may contain component type attributes such as a deductible type, a co-insurance amount or amounts, or limit amounts.

The entries into the component type tables 510 create and specify the valid relationships, valid rules, and valid attributes of the components that may include a product/offering or template. Accordingly, the insurance product definition or product tree 842 may include relationships between specific components based on information specified in the component type relationships table 540.

The component type attribute table 530 may specify the valid attributes that may be assigned to the component tables of an insurance product component, as depicted in FIGS. 6 and 7. Valid entries in the component tables may be based upon information captured within the component type attribute table 530 and component type rule types table 520. The component type tables 510 may create the valid corresponding relationships between each component and provide the basic "structure." The relationships in combination with the components may form a hierarchical "tree" structure. The valid component type attributes and valid rule types listed in association with the component type tables 510 may provide the business user with a list of attributes to select when configuring one of a component, template, or product/offering.

In FIG. 6, an example reusable component 600 may be created and stored in an insurance component library included in the library databases 130. The reusable component 600 includes flexibility that enables definition and maintenance of reusable insurance components. Based upon the component types described in the tables associated with FIG. 5, a business user may create components for use in an insurance product, template, or line of business.

As depicted in FIG. 6, with continuing reference to FIGS. 1-5, an example of an insurance component 610 may be linked or associated with a component rule types 630 and a component attributes 640. For example, a reusable component 600 may be specified as a "loss of use," based on component-type "coverage". Another component may be created as a "collision" product component based on the component type "coverage". These components may be reused in any number of products/offerings or templates where these coverages are applicable. The insurance component library may include components created for each component type.

Accordingly, the business user of the product development portal 410 may select the attributes and the values of the attributes to be applied to a given component as specified in each respective component attributes 640.

A business user may also select rule types to be applied to a given insurance component 610. The rule types may be created or assigned in the component type rule types table 520 of the respective component.

When a component is reused to create an insurance product template or a product offering, the attribute and rule type selected in the component library are pre-selected for the component in the context of the insurance product template or the product/offering. For example, the user interface 112 may display pre-selected entries for each selected component. The displayed pre-selected entries may be accepted or modified based upon the functional definition of the selected component. As a result, the ICC design and configuration environment 230 may utilize the user interface 112 to govern and centralized product definitions developed by business users.

By using a product data structure, components may be reused and supported in levels of definition. Validation and edits of the data associated with each component insures the data quality. In addition, the granularity provided by the component permits the business user to understand which system owns a particular attribute. Allowing each component to include an inheritance-based model further promotes design and implementation of products based upon a master definition as maintained in a component library.

The product development portal 410 may be configured to support a business process based interaction model that also supports configurable process definitions. The product development process is thereby based on a product definition and the business user type/channel for the insurance product. As a result, the business user may only consume the services related to ratings and underwriting rules as part of the processing acts, which streamlines the product development process.

In addition, by associating the rule types with component adapter services, ICC design and configuration environment 230 works in conjunction with the ICC runtime environment 240 to configure the Configurable Engines 250. The rules provide for adaptable services to enable best of breed insurance product tools or legacy integration for configurable underwriting, rating, form selection, and task management business rules. Rule types are developed by the business user when specifying the information about a particular insurance component and these rule types and associated attributes may be used to connect to one of the engine servers 160. For example, a user may specify that for a particular coverage type component, the "rating/base rating" rule type may apply, and that that particular rule type is associated to rating rules stored in an externally available ratings engine.

The dynamic user interface 112 allows for generation and presentation of new products to business users. The ease of generation and presentation facilitate deployment of rule-driven data capture and conversational questions and answers for the new business quotation and underwriting process.

In addition, because the ICC product development portal 410 supports both the policy runtime environment 430 and book of business impact modeling testing environment 440, the business user is presented with a unified rules management work bench. The unified rules management work bench enables the business user to create and maintain business rules centrally through a single facility.

The product offering structure allows business users to create templates and products/offerings based upon component types and the configurations specified in the component type table 510. The business user may use or reuse components from the component library to create an insurance product template or a product offering. The components may be assembled to create a component relationship, as depicted in FIG. 6.

Similar to the definition of a component type table 500, FIG. 7 depicts an example of a product/offering structure 700. Product/offering structure 700 includes at least one insurance component 710 having associated component rule types 720 and component attributes 730. In addition, insurance component 710 may include component relationships 740.

An insurance product template or a product offering based upon components from the component library may include preselected component attributes 730 and component rule types 720. A business user may deselect component attributes that do not apply to the insurance components 710 in the context of the insurance product template or the product/offering being developed.

The business user may select additional component type attributes from the attributes listed in the component type attribute table 530. The user may deselect and/or select the appropriate rule types for the insurance component 710 within the insurance product template or product/offering under development.

For example, an insurance product may be described as a plurality of insurance components 710. Each insurance component 710 may be based on a component type 500 and specify some or all of the contents of a component type table 510, a component type rule types table 520, a component type attributes table 530, and a component type relationships table 540.

The plurality of insurance components 710 may include at least one relationship to at least one other component of the insurance product. Each relationship may be created based upon valid entries in the component type relationships table 540 of each component. The relationships for each of the insurance components 710 are a function of the component type relationships table 740 of each of the insurance components 710. The combination of the relationship creates hierarchical relationships that describe a structure of the insurance product.

Each insurance component 710 may be based upon entries in the component type rule types table 520. The entries in each component type rule types table 520 may indicate the valid rule types for a particular component type. The ICC core 310 may select entries of the component type rule types table to be mapped or associated with a component adapter. Each instantiation of the insurance component 710 may be associated with an appropriate component adapter. As described above, the selected component adapter may link or map the component to the databases or configurable logic associated with one or more configurable engines 250 or the engine servers 160 configured to execute the configurable engines 250.

In an alternative example, with less flexibility, the component type rule types table 520 may associate the insurance component 710 to a configurable content resident on one or more of a plurality of configurable engines 250.

The component type attribute table 530 of each insurance component 710 may also include one attribute entry in each component attribute table of each of the components, where each attribute specifies a portion of the coverage or coverage conditions of the insurance product.

Figure 8A:
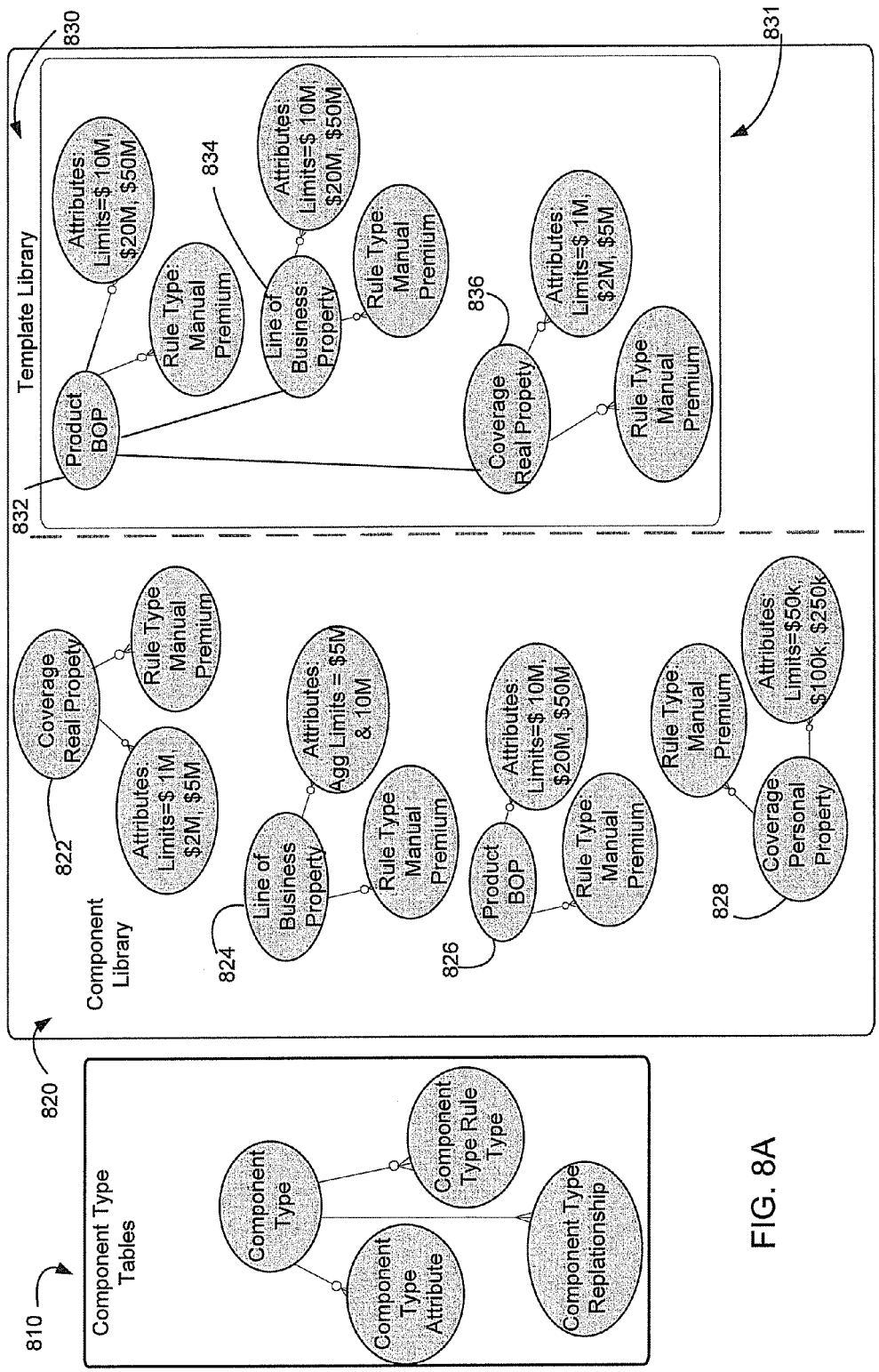
FIG. 8A depicts example component libraries and template libraries based upon the reusable insurance components.
Figure 8B:
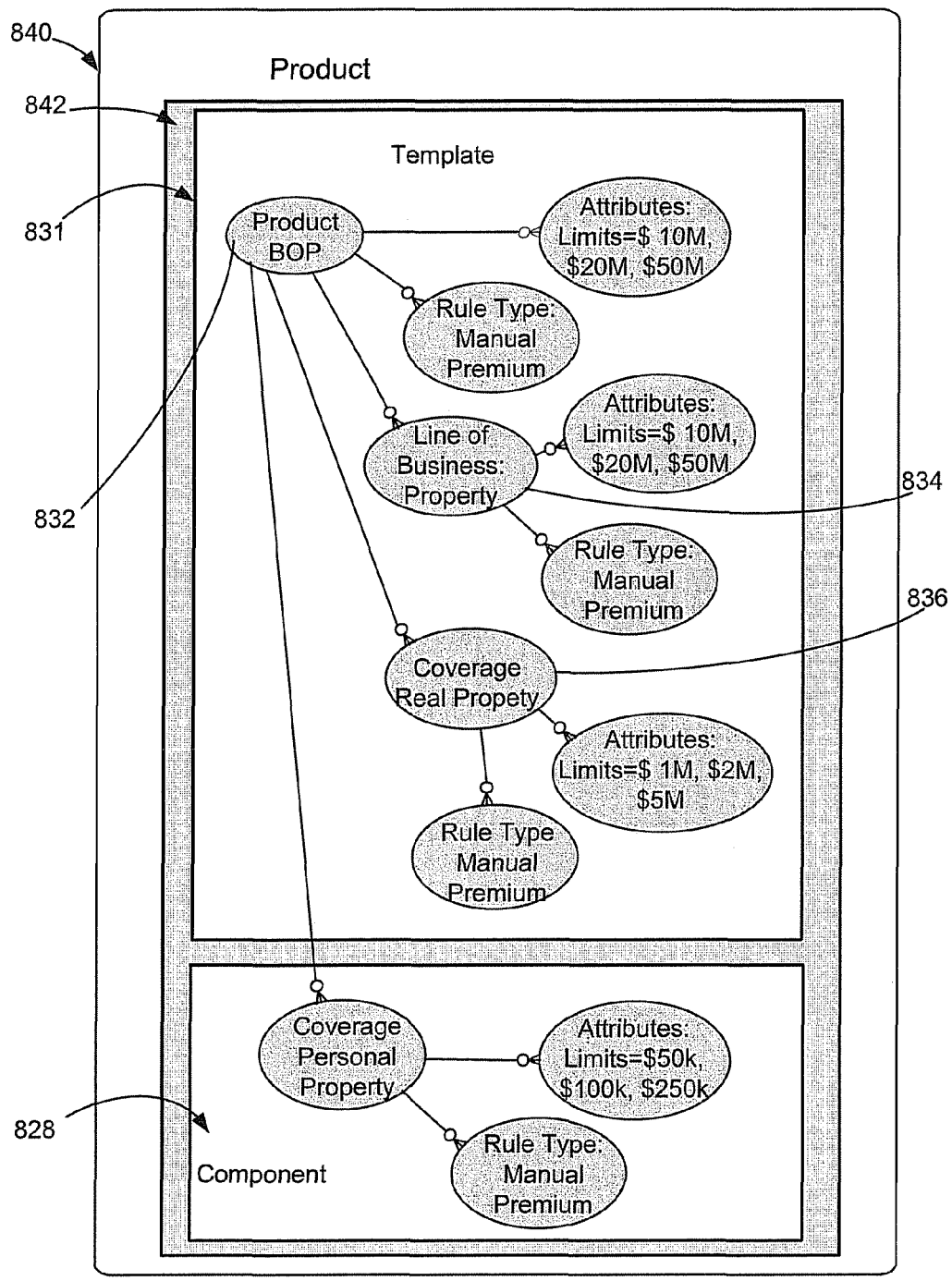
FIG. 8B depicts an example product made up of the example component libraries and template libraries.

FIG. 8A includes an example relationship between component type tables 810, component libraries 820, template libraries 830, and products or product libraries 840. As previously discussed, component types and the respective configurations, attributes, and rule types may be created in the component type tables 810. In the component library 820, the business user may create various numbers of components.

For example, in FIGS. 8A and 8B, a business user may create four different components 822, 824, 826 and 828 in the component library 820. A first component is the "coverage: real property" component 822. A second component in the component library 820 is a "line of business property" component 824. A third component in the component library 820 is a "product BOP" component 826. A fourth component in the component library 820 is a "coverage personal property" component 828. In other examples, fewer or greater numbers of components 500, 600, and 700 may be included in the component library 820.

In FIG. 8A, an example of the coverage real property component 822 includes an attribute with limits having potential assigned values of $1,000,000, $2,000,000, and $5,000,000. The coverage real property component 822 may have a component type rule type set to manual premium. A manual premium may be defined as a premium that may be entered by the business user. In some example insurance components, the component type rule type may be set to predetermined values.

The line of business property component 824 may include a component type attribute named aggregate limits (Agg. Limits) with potential values of $5,000,000 and $10,000,000. The line of business property component 824 may further include a component type rule type set to manual premium. The product BOP component 826 may include a component type attribute (Agg. Limits) with potential values of $10,000,000, $20,000,000, and $50,000,000. A component type rule type may have a value set to manual premium.

The coverage personal property component 828 may have a component type attribute of (Limits) with potential values of $50,000, $100,000, and $250,000. The coverage personal property component 828 may include a component type rule type with a value set to manual premium. The template library 830 may include one or more templates for defining products that are pre-instantiations. The insurance product templates may permit authorized users to create templates. A librarian may also create insurance product templates and insurance components.

In FIG. 8A, one example insurance component is an insurance product/offering template 832. The insurance product/offering template 831 may include a "product BOP" component 832, a "line of business property" component 834, and a "coverage real property" component 836. The product BOP component 832 may include a component type relationship to the line of business property component 834. In addition, the line of business property component 834 may have a component type relationship to the coverage real property component 836. Each of the components 832, 834, and 836, may include associated attributes and rule types.

In FIG. 8B, the product library 840 may include a first product definition 842. The first product definition 842 may include an instantiation of the insurance product templates 832, 834, 836, and the component 828. The product BOP component 842 includes the insurance product template 831.

The line of business property component 834 may further include a component type relationship to the coverage personal property component 838. The component 828 may be instantiated and linked to the insurance product template 831 to form a product.

During development, coherency rules may be applied to components, templates, and product/offerings to provide a foundation for reusability and long-term maintenance. The ICC core 310 may apply coherency rules to each instance of a component, template, and product/offering. The ICC core 310 may examine the coherency rule for components, templates, and product/offerings to determine whether the respective components, templates, and product/offerings include valid attribute assignments or table entries. The ICC core 310 may determine whether each components, templates, and product/offerings is authorized for use in a particular insurance product, archival status, deployment status, regulatory status, and publication status. The ICC core 310 may determine whether the relationships and associations between the various insurance product components are valid and stable. The ICC core 310 may further determine whether the relationships and associations between the various insurance product components are supportable by the runtime environment 430 or the book of business (impact modeling) test environment 440. The ICC core 310 may analyze a selected rule type, sub-rule type, and sub-rule type. The ICC core 310 determines whether a selected rule type is supported by the runtime environment 430 or the book of business (impact modeling) test environment 440.

For example, the component coherency rules may be checked at designated checkpoints during the product development process to prevent creation of invalid structures or components in the product library 840. The coherency rule may be applied at different levels of the product/offering hierarchy in order to govern the structural coherency of the particular product/offering.

In some instances, only the product/offering structures that adhere to a data coherency rule may be deemed "coherent." Depending upon the particular business or IT policies, the ICC design and configuration environment 230 may only allow deployment of products deemed to be coherent into a runtime environment. Because the coherency rules may be updated frequently or modified per installation, the coherency rules may be developed and encapsulated within an application component. An application component may include a computer program code module stored in the ICC applications database 132 and executable on the servers 130. The encapsulation of coherency rules allows the encapsulated application component to be easily updated in the future with minimal impact to the overall ICC design and configuration environment.

As another example, the ICC design and configuration environment 230 may be configured to break coherency. As an example, a business user may configure a product at the time of deployment of an insurance product/offering to limit the scope of the inherency of a component, template, product, or offering.

In the event that a previously fielded product or offering requires adjustment, the ICC design and configuration environment 230 may be configured to re-import the instances of the product/offering. The re-imported instances may selectively establish coherency with the library. Alternatively, the instance may be imported without reestablishing the coherency requirements, as if the previously deployed insurance product or offering was a newly-generated insurance product or offering.

The ICC design and configuration environment 230 may determine which components would no longer pass the coherency check. Thereafter, those components that are no longer coherent become independent components, templates, products/offerings from the parent components, templates, or products/offerings.

Instead, the independent components, templates, or products are treated as a new component within the component library 820, template library 830, or product library 840. Thereafter, coherency checks may proceed as if the to be modified product or offering were a new product or offering without importing undesirable changes due to the inheritance qualities of the components within the component library 820 and template library 830.

Figure 9:
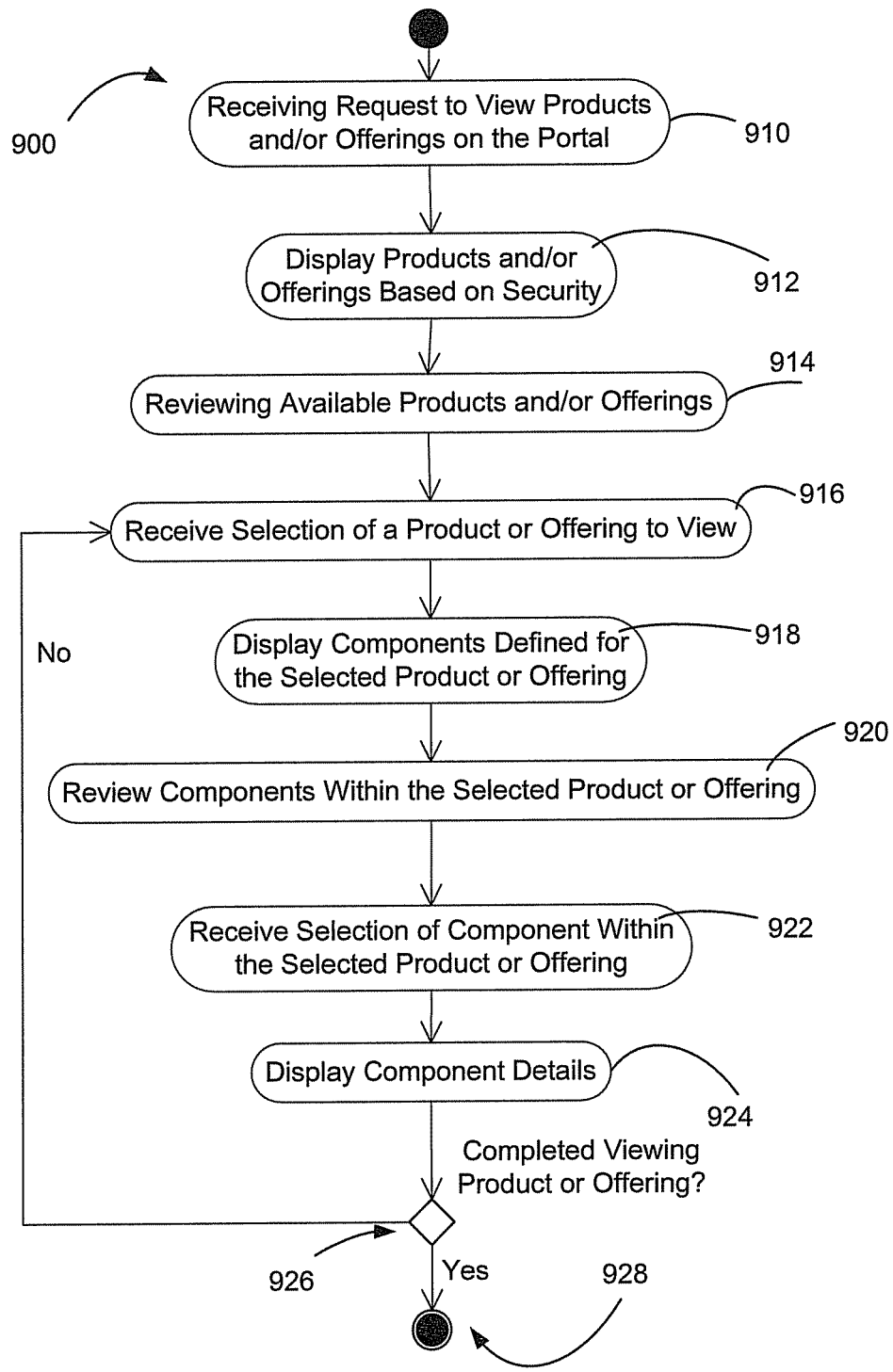
FIG. 9 depicts an operational flow diagram for product/offering development.

In FIG. 9, an example operation 900 to generate insurance products or offerings. At act 910 the business user may access or view existing insurance products and/or offerings through the user interface 112. The products and/or offerings may be displayed through the ICC configuration workstation front end 300 on user portal 110.

In response to selection of the product, the user interface/front end 112 receives a request to view the selected products and or offering on the user portal 110. The request to view the selected product is sent via the communication network 120 to servers 130. Servers 130 receive the request and provide the information to the ICC core 310 software modules resident on the servers 130.

Alternatively, the user may search for or select a product or component from the library. To search the library, in response to a request received via the user interface 112, the user portal 110 transmits a request to servers 130 to obtain a list of products and/or offerings for display on the user portal 110. Thereafter, the operation continues to act 912.

At act 912, the servers 130 may determine whether the user is entitled to receive the requested information for the selected insurance product or offering. Servers 130 may access security management information associated with the ICC core 310 functionality and determine whether the user is authorized to view the requested information. If the user is unauthorized, the servers 130 return an indication to the user portal 110 that the user is unauthorized to access the information. Based upon the received indication, the ICC configuration workstation front end 300 displays an indication on the user interface 112 that the user is unauthorized to access the requested information from the library.

If the ICC core 310 determines the user is authorized to receive the request insurance product information, the ICC core 310 further determines the location of the information related to the selected insurance product or offering. The servers 130 send a get or similar request to the product databases 140 to request the product definition information related to the selected product or offering. In response to the request for the product definition information, the servers 130 may create a displayable graphical representation of the requested product or offering.

Alternatively, the servers 130 may determine which, if any, insurance product definition information the user is entitled to receive. In response to the request, the servers 130 may provide a list of offerings or products to the user portal 110 for display on the user interface 112. The system display list of products and/or offerings may be based on the security authorization of the business user of portal 110.

Figure 12:
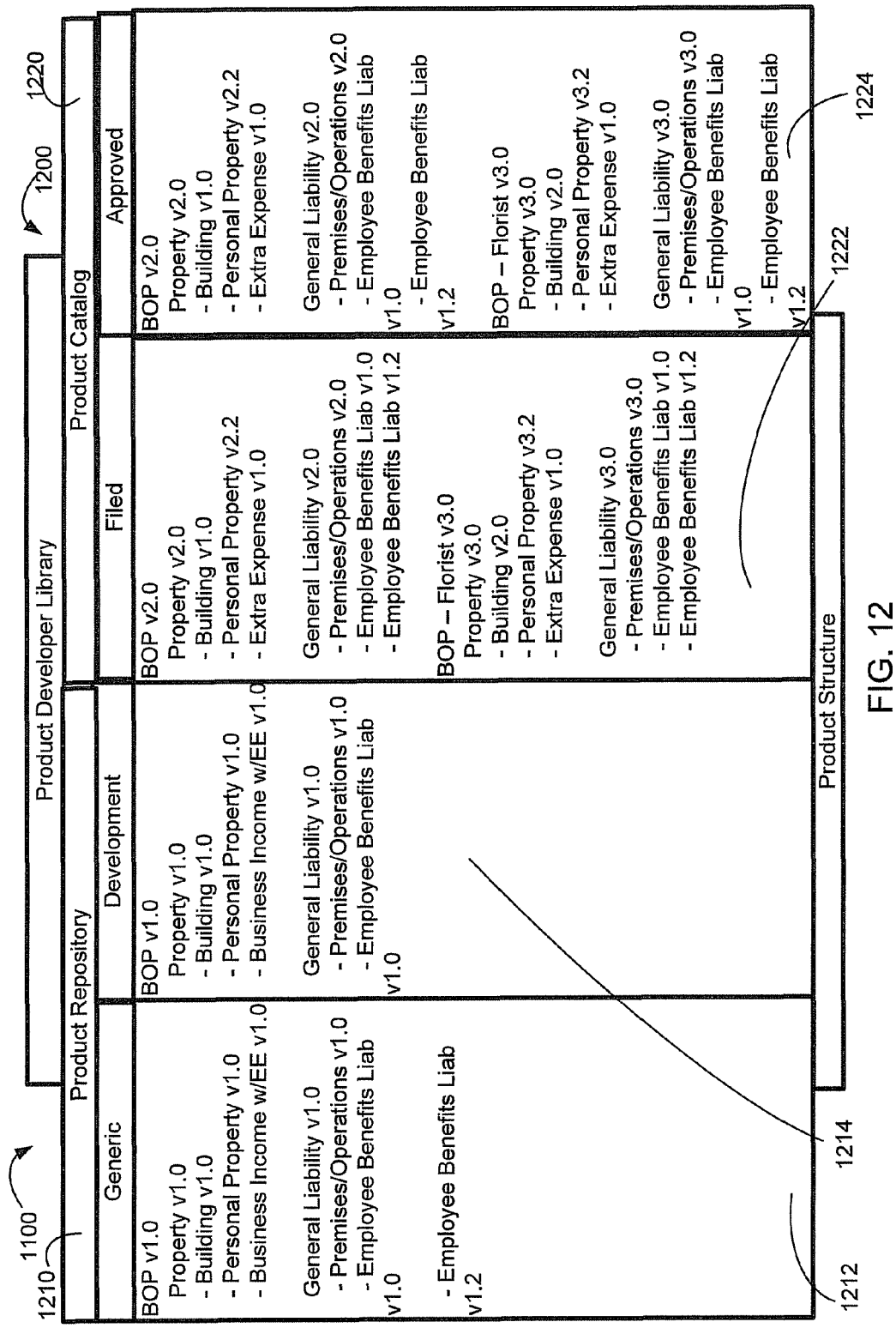
FIG. 12 depicts a library database for developing insurance products/offerings, insurance product templates, and/or components.

At act 914, the user portal 110 displays the products and/or offerings available for the user to review. In addition, the user interface 112 may provide the user with potential inputs to select one or more products and/or offerings. As an example, as depicted in FIG. 12, the servers 130 may get a library of products or offerings from a product repository 1212 or product catalog 1220 stored on the product databases 140. The servers 130 may provide the insurance product information stored in the product repository 1212 or product catalog 1220 to the user portal 110 for display upon the user interface/front end 112.

As another example, user interface 112 may be configured to display a list of insurance product associated with the user. Depending upon the access rights assigned to a user, the user interface 112 displays a limited number of insurance products or offerings. At act 914, the details of each displayed insurance product or offering may be obtained by highlighting the insurance product or offering with the cursor. For example, the user may place a mouse cursor over the desired product and actuate one of the mouse buttons to select a product.

At act 916, the user portal 110 receives the business user selection of a product or offering to view. In response to receipt of the user selection, the user portal 110 transmits a request for a display of components that specify the selected product or offering to servers 130.

The servers 130 may retrieve or get insurance product information stored in the product databases 140 associated with the selected product or offering. Based upon the received insurance product information, the servers 130 may use the attributes or other information associated with the respective component type tables to determine the relationships between each of the insurance product components and to characterize or formulate the information for display. In addition, the servers 130 may access the product databases 140 and the library databases 150 to locate the information associated with the selected insurance product or offering.

At act 918, in response to receipt of the information associated with the selected insurance product or offering, the servers 130 may invoke the ICC core 310 software modules to generate a user interface/front end 112 for display on the user portal 110. As an example, the ICC core 310 software modules may generate a web-based user interface to be sent to the user portal 110. The web-based user interface may include embedded links to the information associated with the selected insurance product or offering. As another example, the ICC core 310 may configure the information related to the selected insurance product or offering for display on a graphical user interface 112 resident on the user portal 110.

Servers 130 may parse the received product definition information to display a product tree 842. The product tree 842 displays a hierarchical view of the insurance product or offering and permits the user to review the various insurance lines of businesses, insurance components and rulesets associated with the selected product.

As an example, the web-based user interface/front end 112 may display the components that specify the selected product or offering. After the appropriate user interface 112 is generated, the server sends the user portal 110 display information for the components that specify the selected product or offering. In response to receipt of the display information, The user portal 110 updates the user interface 112.

At act 920, the user interface 112 may display the selected product or offering to permit the user to review the components. The web-based user interface/front end 112 is configured to receive a selection of one of the components or templates within the product offering. The user interface 112 may display the product offering as a hierarchical view including templates and components that may be expanded or collapsed. The user interface/front end 112 may allow a user to push into the various levels of the hierarchical view of the insurance products, lines of businesses associated with insurance products, components and rules of a particular insurance product. Alternatively, the user interface/front end 112 may be configured to allow a user to collapse the hierarchical view of the selected insurance product or offering.

In addition, the user may view product details through the ICC configuration workstation front end 300 displayed on user interface 112. As an example, the user may also select the menu options that permit viewing of models of an insurance component, different rules that can be applied to the insurance component, and reference data for a model of the insurance component. The ICC configuration workstation front end 300 may further be configured to permit a user to push or drill down into the characteristics of the selected insurance product or offering.

As part of the review process, at 920, the user may highlight a particular component of interest to be selected for the addition of a definition, refinement, or deletion. Thereafter, operation 900 continues to act 922.

At act 922, the user interface 112 may be configured to receive a selection of a component within the selected product or offering. Upon receipt of the user selection of the component, the user portal may send a request for component information related to the selected component through the network 120 to servers 130.

In response to the request for information related to the select component, the ICC core 310 resident on the servers 130 may retrieve the component information related to the selected component from the product databases 140 or library databases 150. Upon retrieval of the component information, the servers 130 may characterize or formulate the component information for display on the user interface/front end 112 of user portal 110.

Thereafter, the servers 130 send the component information to be displayed to the user portal 110 and update the user interface 112 accordingly. Thereafter operation continues to act 924 and displays component details.

If the previously received information already includes specific details of the selected component, at act 924 the user interface 112 displays the component details. However, if necessary, the user portal 110 requests servers 130 to provide the additional component detail from either the library databases 140 or the product databases 150. Upon receipt of the additional component details from servers 130, the user portal 110 displays the component details through the web-based user interface/front end 112.

At act 926, the operation determines whether the user desires to view other products or offerings. The user may review an additional product, offering, or components within a product or offering. If the user selects to leave the viewing of products or offerings, the operation 900 proceeds to exit 928. Otherwise, operation 900 returns to act 916.

Figure 10A:
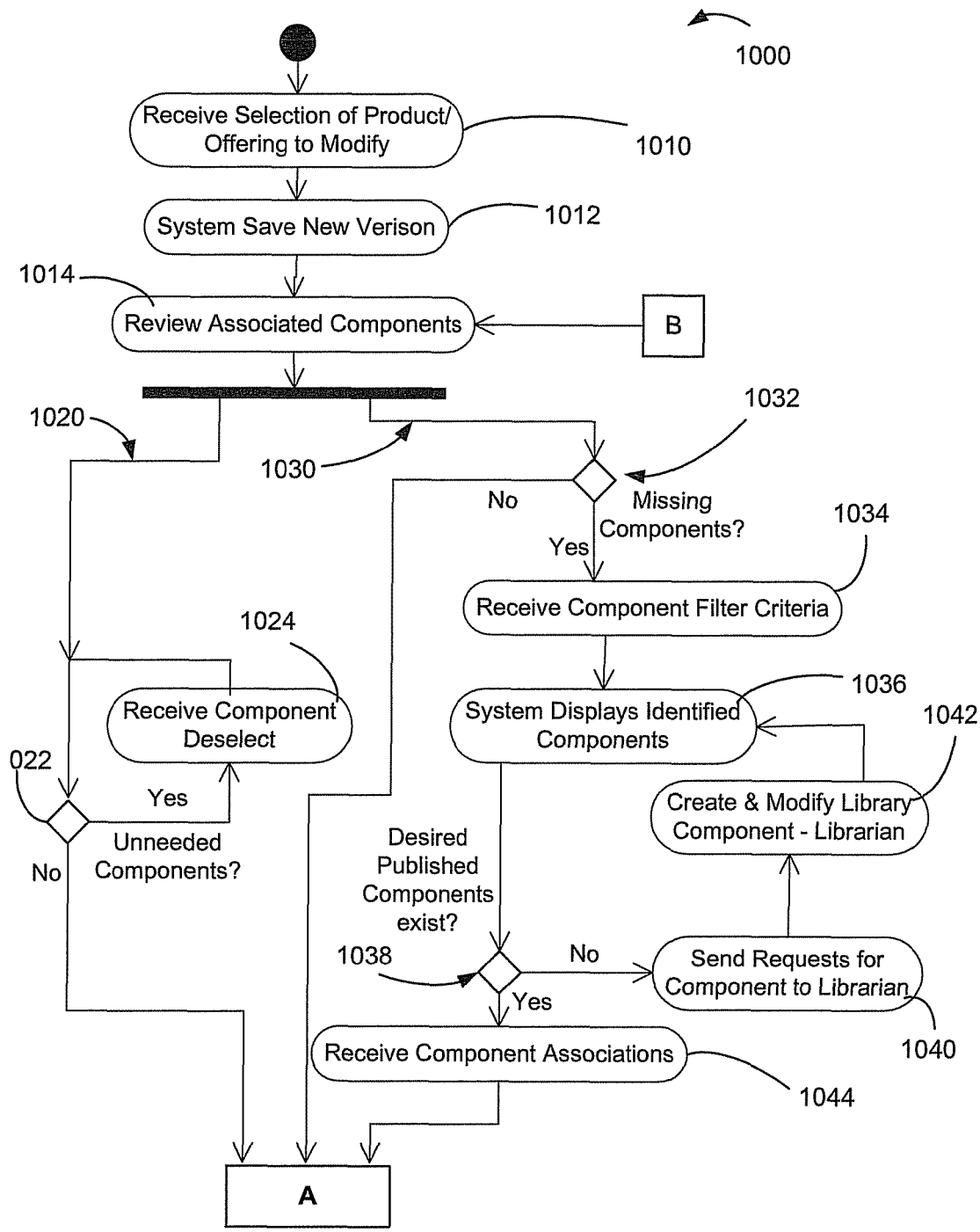
FIGS. 10A and 10B depict an operational flow diagram for creating or modifying one of a product or offering.
Figure 10B:
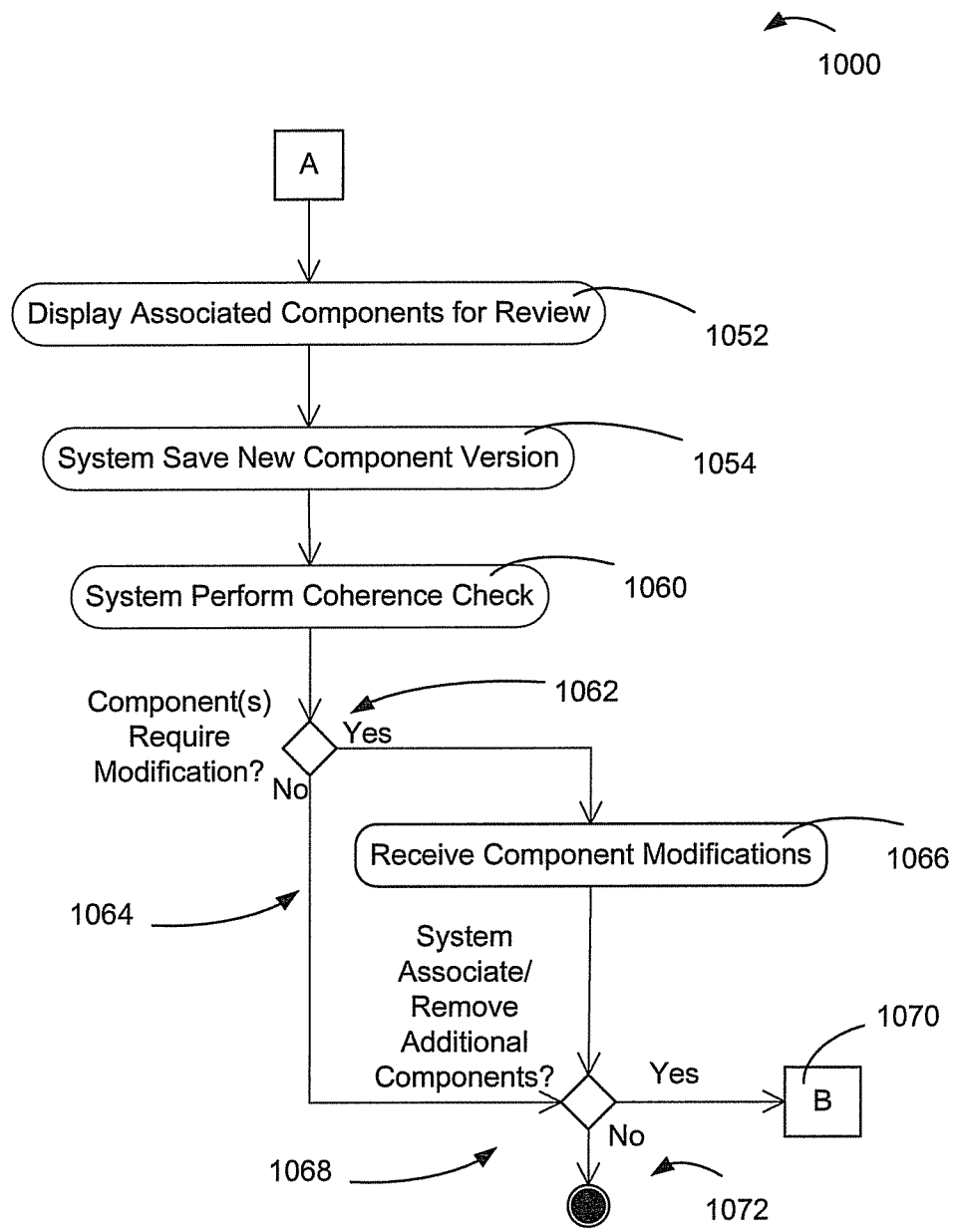

In FIGS. 10A and 10B, an example of a product/offering developer operation 1000 for modifying library components that may be used to create a product or an offering is discussed with reference to FIGS. 1-9. Through user interface 112, at act 1010, the business user may select a product or an offering to be modified. As an example, the business user may select an insurance line of business, an insurance product, a line of business, a coverage, or a sub-coverage from the hierarchical tree structure of the insurance product template 831.

In response to selection of a product, template, or component, the servers 130 access at least one of the library databases 150 or product databases 140 to retrieve information related to the selected insurance product component. In response to receipt of the selected product or offering, the servers 130 may retrieve or send the information to the user portal 110 for display in the user interface/front end 112, and the operation proceeds to act 1012.

At act 1012, the user may save the selected product offering as a new version to the library databases 150. In response, server 130 saves the selected product or offering in product library databases 150 as a new version with a new version number. The user interface 112 may receive user instructions to expand or collapse the hierarchical view of the library, insurance components within the library, or new version of the product.

At act 1014, the business user may review the components associated with the product or offering to be modified. The user interface 112 may display information related to the new version of the offering. The user interface 112 may display a viewable products window. The viewable products window may include hierarchically arranged insurance product components that may be interconnected within an insurance product structure. The hierarchically viewable products window may display the name, description, business effective date, business expiration date, and action related to a particular insurance product or component.

The hierarchically displayed insurance product may include the relationship between various insurance products, lines of businesses, coverages, and subcoverages. The user interface may allow the user to expand or collapse the hierarchical view of the insurance product being modified.

Following review of the components within the ICC design and configuration environment 230, the user interface may receive selections of different functions to create and/or modify insurance components. In a first flow 1020, the user may determine whether a particular component is unneeded for the modified product or offering at act 1022. If there are no unneeded components, the operation may continue to act 1052. Otherwise, operation proceeds to act 1024.

At act 1024, the user interface may receive deselections of components that are unneeded. The deselection process permits a user to "prune" away undesired insurance product components. The deselection process continues until all the unneeded components are removed. After the undesired components of the product or offering are removed, the user interface 112 may receive an indication that the "pruning" process is completed. In response, the user portal 110 may provide an indication to the servers 130 that the product offering was modified and request that the updated offer information be displayed.

At act 1032, operation 1000 determines whether there are any missing components. If there are no missing components, the operation proceeds to act 1152. In the event that there are missing components, the operation proceeds to act 1014. Otherwise, after the unnecessary components are removed, operation 1000 proceeds to 1052.

At act 1034, the user may access a search function in the ICC design and configuration environment 230. Filter criteria may be used to identify a component or an insurance product template that exists in the library databases 140. A search specification user interface and a search results user interface may permit the user to select from a list of insurance components to be retrieved from either the product databases 140 or the library databases 150. Alternatively, the user may enter the name of a desired product or library component to be retrieved from the product databases 140 or library databases 150.

The user portal 110 sends the search criteria information to servers 130. In response, server 130 searches the product databases 140 or library databases 150 to locate potential insurance components that correspond to the search criteria information.

After the servers 130 identified the desired insurance components in either the product databases 140 or the library databases 150, the servers 130 provide the results of the search to the user portal 110 for display in a user interface 112. Thereafter, the operation proceeds to act 1036.

At act 1036, the user portal 110 displays components that meet the filter criteria as specified at act 1034. The user may select one of the insurance components identified by the search. The identified insurance component may be added to the product or offering. After adding the selected component, the operation proceeds to act 1038.

At act 1038, as an example, the user interface may allow a user to provide an indication of whether the desired published component exists in either the product databases 140 or the library databases 150. If the desired published component does not exist, the operation proceeds to act 1040. Otherwise, if the desired components already exist in the product databases 140 or the library databases, the operation proceeds to act 1044.

At act 1040 the user requests that a librarian or user with oversight control of the library databases 150 create and/or publish the desired component.

Figure 11:
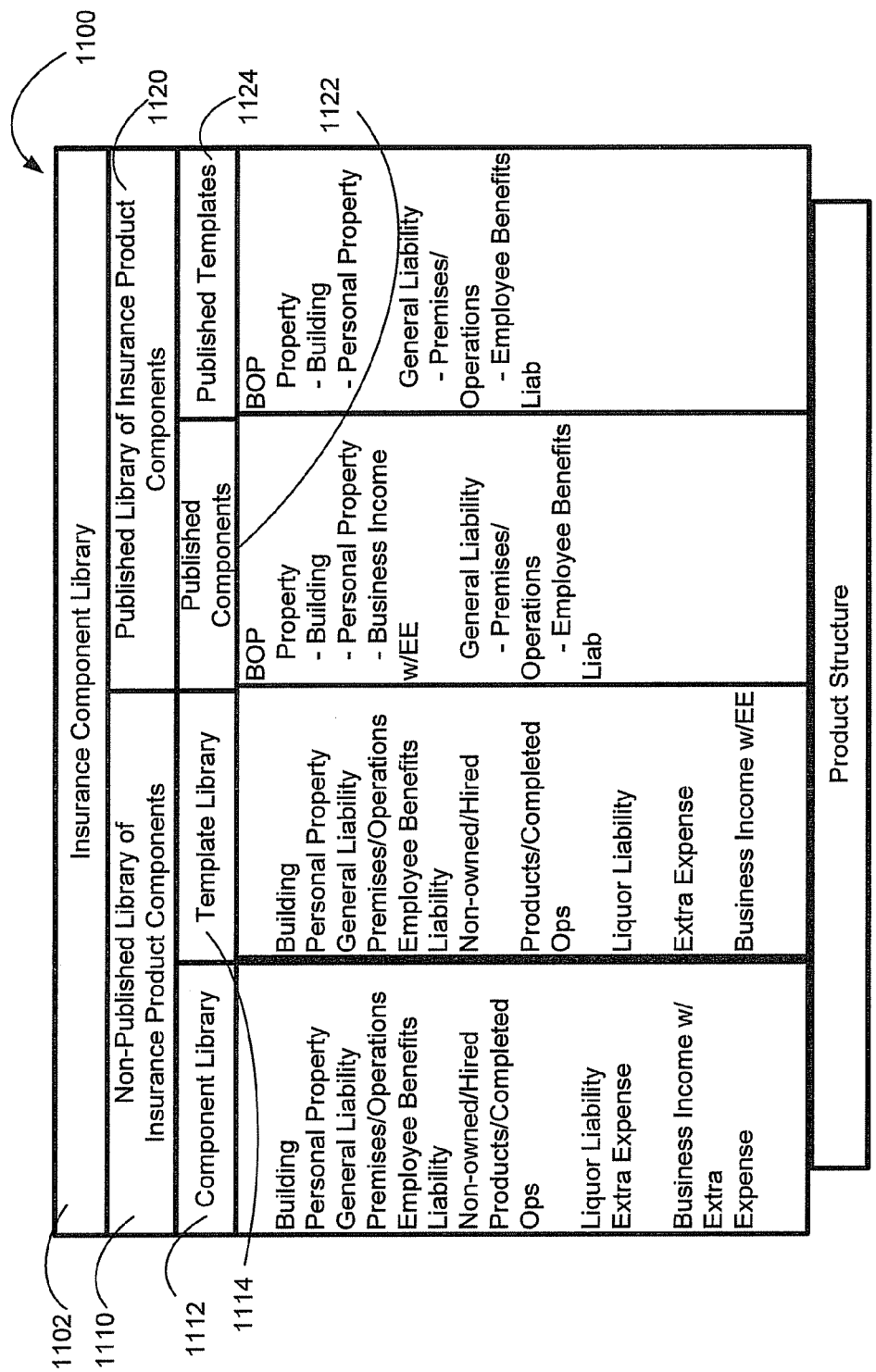
FIG. 11 depicts a library database for developing insurance products/offerings, insurance product templates, and/or components.

At act 1042, the librarian creates or modifies a library component to be stored in library databases 150. After the desired insurance component is created or modified and stored in the library databases 150, the user is notified that the insurance product component is available. As an example, the newly created insurance component may be viewed and accessed from the insurance component library 1112, as depicted in FIG. 11. If the new insurance component is an insurance product template, as depicted in FIG. 11, the newly created insurance product template may be viewed and accessed in the template library 1114, and the flow returns to act 1036.

At act 1044, the user interface 112 receives a component association to associate the desired component with the offer or product. In response, ICC core 310 may associate the desired components with the selected product or offering to be modified. After associating the desired components to the other components within the selected product or offering to be modified, the operation continues to act 1052.

At act 1052, in FIG. 10B, the user interface 112 may allow the user to review the associated components. The user interface 112 may display insurance component information associated with the desired insurance component. The user interface 112 may display product offering general information. The user portal 110 may receive data through the user interface 112 to add details and additional information to the selected insurance component. The user may select rule type designations based upon predefined rule types. In addition, the rule types may include hierarchically arranged sub-rule types. For example, a "financials" rule type may be subordinate to an "underwriting" rule type. The "credit" and "bankruptcy" rule types may be subordinate of the "financials" rule type.

The user interface 112 may provide information related to coverage information, subcoverages, and covered items. In response to a user indication to proceed, the operation may continue to act 1054.

At act 1054, the user interface 112 may prompt the user to save the product or offering as a new version of the product or offering in the library databases 150. After saving the new version of the product/offering or template in the library databases 150, the operation may continue to act 1060.

At act 1060, the operation 1000 may initiate a coherency check to verify that the components of the insurance product/offering or template pass the coherency check. To perform the coherency check, the core ICC 310 extracts information stored in the tables associated with each component. The core ICC 310 analyzes the table entries to each respective component type versus the attributes and relationships. Thereafter, the operation 1000 continues to act 1062. In the event the coherency check fails, the user interface provides an indication to the user that there is a coherency check failure and identifies potential sources of the error to be corrected.

At act 1062, the user interface 112 may be configured to receive a selection to permit the user to modify the associated components to address errors or issues raised by the coherency check. The user interface 112 may also be configured to permit modification of the insurance product/offering or template to address other product/offering development reasons. If the components used in the modified product or offering require modification, the operation continues to act 1066. Otherwise, if the components do not require modification 1064, the operation 1000 proceeds to a decision tree 1068.

At act 1066, the product developer may modify a selected component. The user may select various attributes to be modified. The user interface 112 may be configured to receive information to be entered into attribute fields displayed on the user interface 112.

The user interface 112 may receive an indication of whether a particular insurance coverage related attribute was mandatory and a value associated with the attribute.

In addition, the user interface 112 may display relationship information between different insurance product components. The relationship information may include parent and child relationships of the particular insurance component under review. The user may modify the relationships to create a new insurance component, insurance product or offering, or insurance product template.

The user interface 112 may be configured to permit the product developer to substitute a different insurance component. In response to the substitution request, the selected insurance component is deleted and a different insurance component is added to the insurance product. After the product developer has modified the selected insurance components, the operation proceeds to act 1068.

At act 1068, the user determines whether to associate or remove additional insurance components from the modified product or offering. If the modifications to the insurance product or offering are complete, the user may select to exit operation at act 1072. Otherwise, the user may select act 1070 to return to act 1014.

In FIG. 11, an example of an insurance component library system 1100 may be accessed by librarians and qualified/authorized users of the ICC design and configuration environment 230. The ICC design and configuration environment 230 may restrict access to the insurance component library system 1100 based upon the business user's role and authority.

Insurance component library system 1100 may include one or more databases stored on the library databases 150. The library databases 150 may be subdivide to include a plurality of insurance product component categories or component category locations. Each of the insurance product component categories or component category locations is associated with a product development cycle. Each insurance component may be assigned or associated with an insurance product component lifecycle status information that reflects the component category location in which the insurance product or component is stored the lifecycle status information may include one or more lifecycle status parameters that indicate the development status of an insurance product component, insurance product template, or insurance product offering.

Alternatively, the lifecycle status parameter may be divided into component lifecycle parameters and product lifecycle parameters.

As an example, the ICC design and configuration environment 230 executed on the servers 130 may use the product lifecycle parameter or the component category location to govern when or how a particular insurance product component or template may be used to create or develop an insurance product offering. In addition, as the product component lifecycle parameter is changed through the development process, the servers 130 may automatically move the insurance product component to a different component category location.

The ICC design and configuration environment 230 may include, as an example, multiple insurance product component categories or component category locations, The insurance component library system 1100 may include a insurance component library 1102. The insurance component library 1102 may include insurance product templates and insurance components. The insurance component library 1102 may be further subdivided into additional insurance component categories or component category locations. As an example the insurance component library 1102 may include a Non-Published Library of Insurance Components 1110 and a Published Library of Insurance Components 1120. Insurance product components and insurance product component template stored in the non-published library of insurance components 1110 may be assigned a product lifecycle parameter or attributes to indicate that it is unpublished.

Alternatively, the non-published library may be referred to as a category location assigned a category parameter that indicates insurance product components contained in the non-published library are unpublished. As an example, each insurance product component may be assigned an publication status parameter that may be set to indicate that the insurance product component is either published or unpublished.

The Non-Published Library of Insurance Components 1110 may include an insurance component library 1112 and an insurance product template library 1114. The insurance component library 1112 may include a variety of insurance components under development. The insurance components in the insurance component library may include prototype or prototypical insurance component that may be modified to meet a specific business requirement or customer requirement.

The Template Library 1114 may include insurance product templates under development or insurance product templates that may be used as a prototype or prototypical insurance component that may be modified to meet a specific customer requirement or business need.

The Published Library of Insurance Components 1120 may include a Published Component Library 1122 and a Published Template Library 1124.

The user interface 112 may be configured to display the insurance component library 1112. In FIG. 11, an example Component Library 1114 may include components available to a business user for development of an insurance product template or a product/offering, as previously discussed.

Example insurance components contained in the insurance component library 1112 may include a building component, a personal property component, a general liability component, a premises/operations components, an employee benefits liability component, a non-owned/hired component, a products/completed ops component, a liquor liability component, an extra expense component, and a business income with extra expense component.

User interface 112 may display the Template Library 1114. Example insurance templates or insurance template components stored in the Template Library 1114 may include building insurance template, a personal property insurance template, a general liability insurance template, a premises/operations insurance template, an employee benefits liability insurance template, a non-owned/hired insurance template, a product/completed Ops insurance template, a Liquor liability with extra expense insurance template, and a business income with extra expense (w/EE) insurance template.

The user interface 112 may also be configured to display the Published Component Library 1122. Example published insurance components stored in the Published Component Library 1122 may include a Business Owner Product (BOP) insurance template. The BOP insurance template may include a property line of business insurance template and a general liability line of business insurance template. The property line of business insurance template includes a building component template and a personal property component template.

In FIG. 11, an example of the general liability line of the business insurance template may include a premises/operations component template and an employee benefits liability component template. An insurance product template may be developed as an interrelated combination of associated insurance components that specify a portion of an insurance product/offering, insurance line of business, insurance coverage or insurance component.

The Published Component Library 1122 of insurance component library system 1100 may include previously created insurance components published for use in a product by a product developer. An example of previously created insurance components stored in the Published Component Library 1122 may include a plurality of insurance product components. As an example, the insurance product components may include a building component, a personal property component, a general liability component, a premises/operations component, an employee benefits liability component, a non-owned/hired component, a products/completed ops component, a liquor liability component, an extra expense component, and a business income with extra expense component. The Published Template Library 1124 may include a BOP template having a further property line of business and a general liability line of business. The property line of business may include a building component, a personal property component, and a business income with extra expense component. The general liability line of business of the BOP template may include a premises/operations component and an employee benefits liability component.

The component library and template libraries may be accessed by users with librarian access rights to develop or modify the respective components of the component library 1112 and template library 1114. The ICC design and configuration environment 230 may permit control of the quality and nature of components and templates to be used by a product developer. Upon completion of the development and testing of the respective components and templates, the librarian may publish the respective components and templates.

Published library 1120 includes the Published Component library 1122 and a Published Template library 1124. Upon publication of an insurance product template from the template library 1114, the insurance product template becomes a published insurance product template available in the Published Template Library 1124. The published templates may be selected by a product developer to develop or create insurance products or offerings.

In response to publishing the component, the server may move the previously unpublished insurance product component from the non-published library of insurance product components 1110 to publish insurance component library 1122 of the published library of insurance product components 1120. In some cases, the server may automatically remove the previously unpublished component from the non-published library of insurance product components 1110. Similarly, in response publishing an insurance template component, the server may move the unpublished insurance product template from template library 1114 of the non-published library of insurance product components 1110 to the published template library 1124 of insurance product components 1120. In some cases, the server removes the previously unpublished insurance product template from the non-published library of insurance product components 1110. In FIG. 12, an example of an insurance product development environment 1200 may be stored in product database 140. The product developer environment 1200 may include an insurance product repository 1210 and a product catalog 1220. The product repository 1210 may include a generic menu of insurance products 1212 and a development menu of insurance products 1214. In other example of the insurance product development environment 1200, the ICC design and configuration environment 230 may support multiple category locations within the insurance product development environment 1200.

The generic menu of insurance products 1212 may include versions of the insurance products/offerings available to be filed or approved and insurance products/offerings that are in the process of creation, testing, benchmarking, or refinement. As an example, the user interface 112 may display the generic menus of insurance products 1212 including a BOP version 1.0, property insurance product or component version 1.0, a personal property insurance product version 1.0, and/or a business income with extra expense insurance product version 1.0. In addition, the user portal 110 may be configured to display additional entries in the generic menu of insurance products 1212 including a general liability insurance product version 1.0, premises/operations insurance product version 1.0, an employee benefits liability (Liab) insurance product version 1.0, and an employee benefits liability (Liab) insurance product version 1.2.

The product catalog 1220 may include products filed with the state regulators or approved products. The product catalog 1220 may include a filed insurance product catalog 1222 and an approved category 1224 of insurance products. The filed category 1222 may include, for example, those products previously developed by a product developer that are filed with the regulatory agencies within the respective state or nation in which the insurance product is to be sold or offered for sale. After an insurance product is filed with the respective regulatory agencies, the product developer library 1200 may safeguard the integrity of the filed product. The product developer library 1200 may temporarily or permanently break inherency between the insurance components in the filed product and the underlying insurance component models that are part of the Insurance component library system or functionality 1100 or the insurance product repository 1214.

The products that receive approval from the regulatory agency for sale within a specific state or a national approval for sale of the insurance product within a national jurisdiction may be placed in the approved category of products 1224. The product developer library 1200 may preclude inherency between the approved insurance product 1224 and the parent insurance product component stored in either the product database 140 or the library database 150.

Figure 13A:
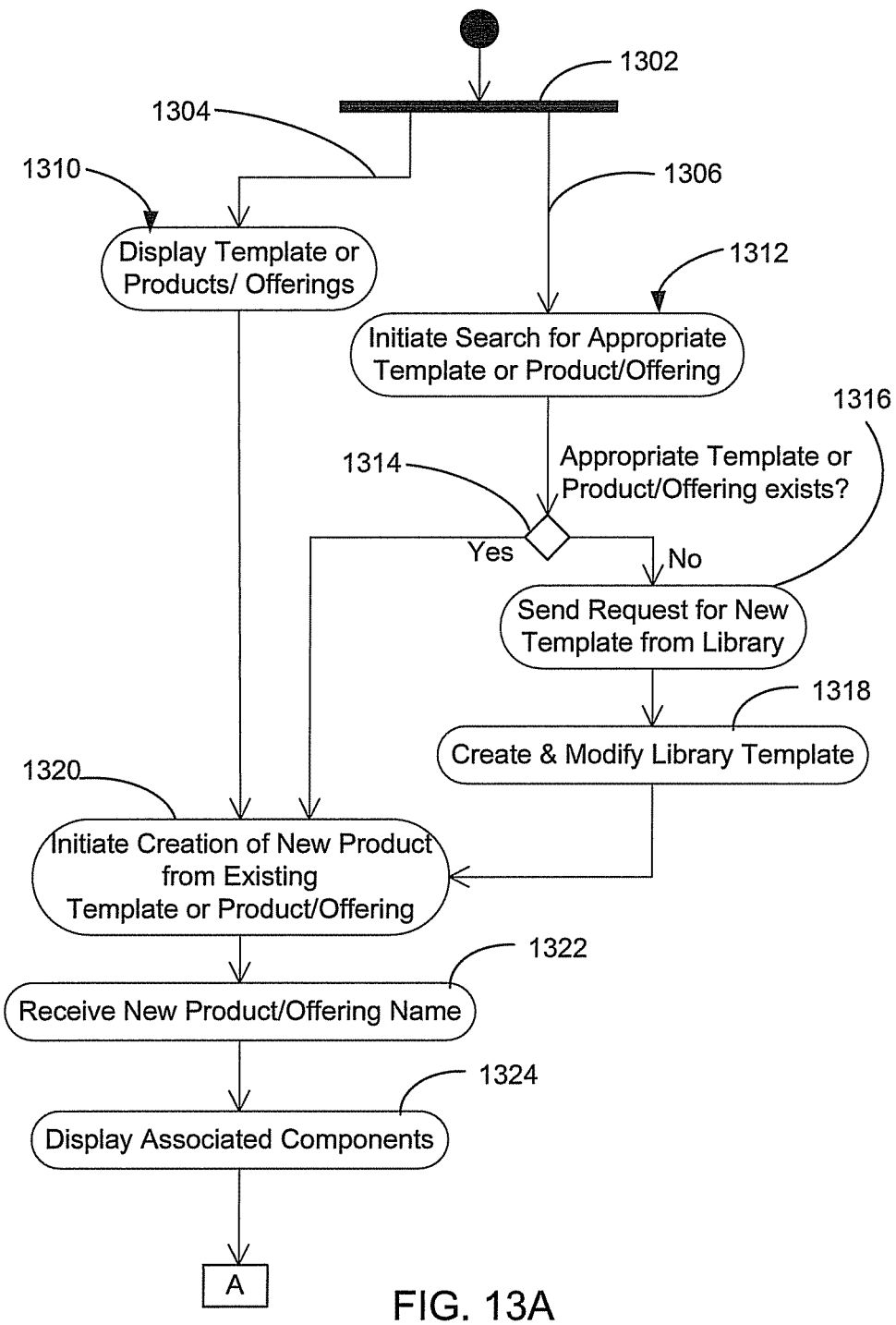
FIGS. 13A, 13B, and 13C depict a system for developing an insurance product template or a product offering for an insurance product.
Figure 13B:
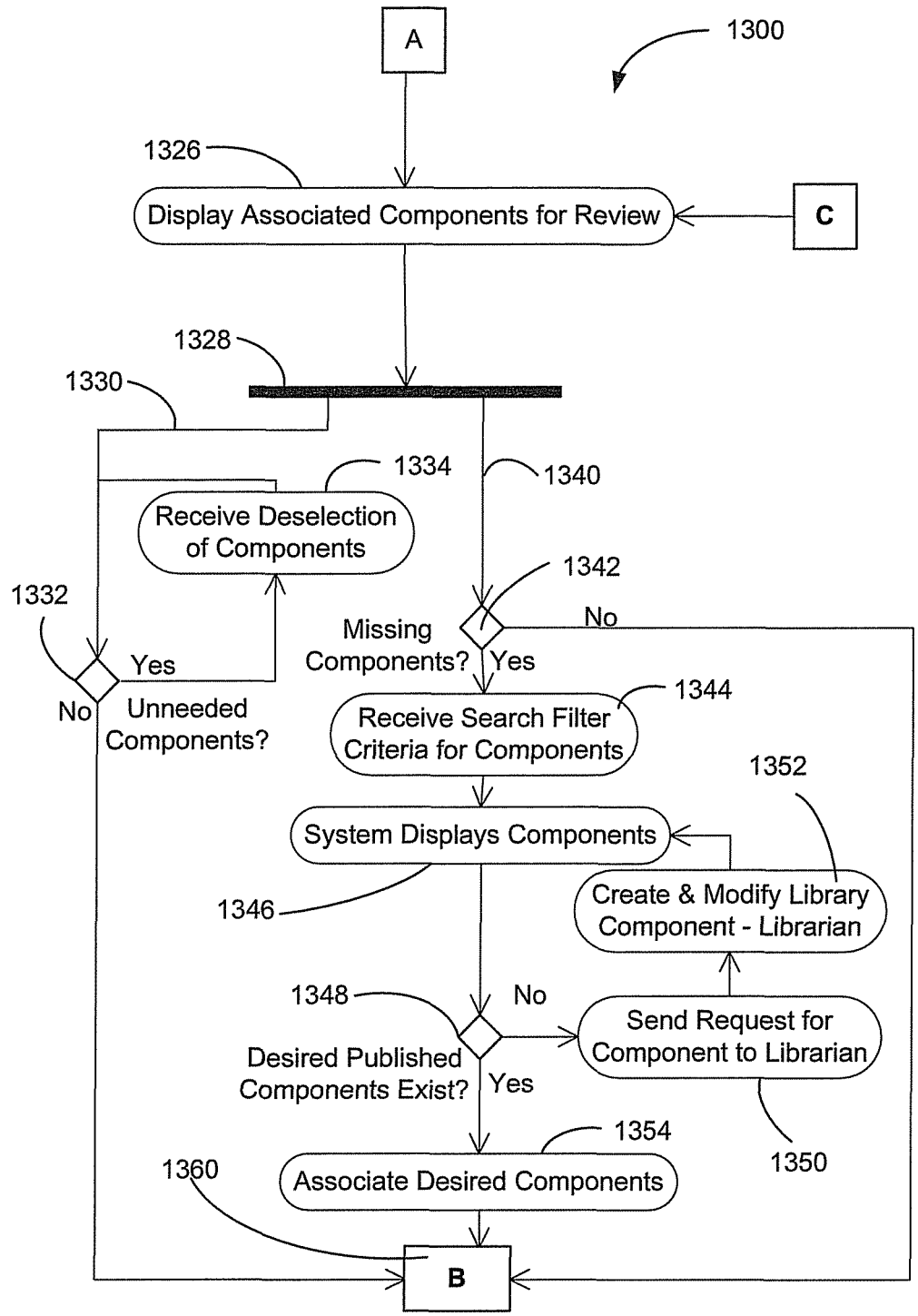
Figure 13C:
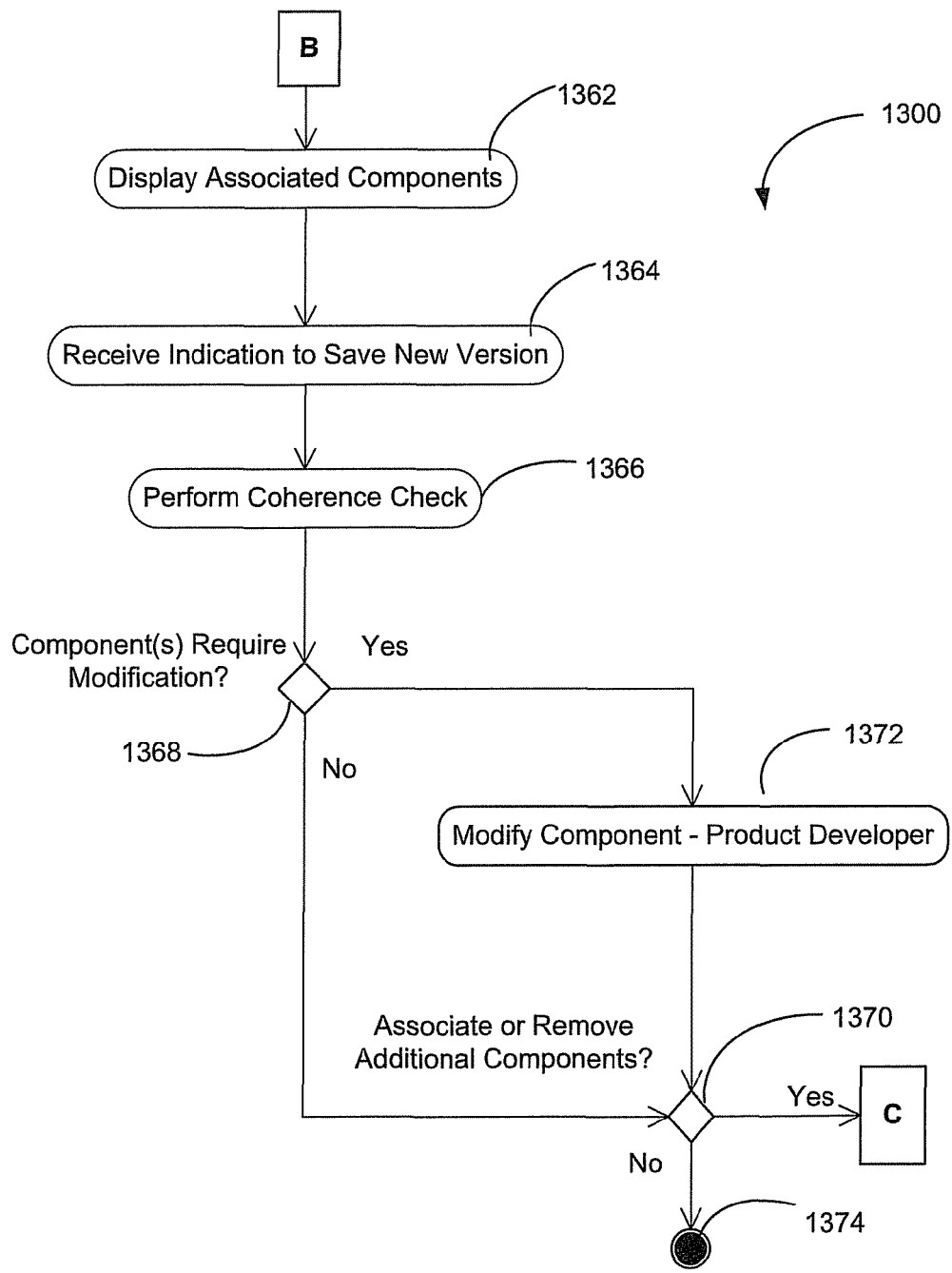

Also, similar to publishing a component, the server 130 may automatically move the insurance product between the various category locations within the insurance product development environment depending upon a lifecycle parameter or attribute assigned to the insurance product. For example, in response to submitting a insurance product for agency approval, the servers may move the insurance product from the product repository 1210 to the product catalog 1820. As another example, the insurance product ready for submission to an agency for approval may be moved to the filed insurance product catalog 1822. In response to receipt of an agency approval and assignment of an approved status to the lifecycle parameter of the insurance product, the server 130 may move the insurance product to the approved category 1824 of insurance products. In FIGS. 13A, 13B, and 13C, an example operational flow diagram 1300 described development of a new insurance product with the ICC configuration workstation front end 300, which is displayed through user interface 112 on the user portal 110. An insurance product developer may access a product repository 1210 and product catalog 1220.

At decision 1302, the ICC configuration workstation front end 300 receives a selection of a desired design process to follow via user interface 112. In response to selection of path 1304, the operation continues to act 1310.

At act 1310, the business user of the insurance configuration facility may view templates or product offerings that already exist from the product repository 1210. In response to a request to view templates or product offerings, the ICC configuration workstation front end 300 resident on the user portal 110 sends a request to the ICC core 310 to provide a display of insurance product templates or available insurance products that are available as a template for a new insurance product in the product databases 140 or the library databases 150. The servers 130 may get or retrieve the generic menu of products 1212 and development menu of products 1214 for review by the product developer.

Alternatively, following flow path 1306, at act 1312, the business user may search the insurance component library 1102, product repository 1210, product catalog 1120, or a personal database associated with the user to locate an appropriate template or product offering. The user may use a search facility associated with the ICC core 310 to locate an appropriate existing product to be modified or to create a new product from scratch. The user may select from the search results an appropriate template or product/offering, operation proceeds to act 1314.

At act 1314, the user portal 110 may receive a listing of available templates or product/offerings stored in the product databases 140 or library databases 150. Depending upon the user authorization and security level, the ICC configuration workstation front end 300 may only display the published component library 1122 and published template library 1124 on the user interface 112. The user interface 112 may be configured to allow the business user to review characteristics and features of the retrieved insurance products or insurance product templates to determine whether an appropriate template or product/offering exists. If an appropriate template or product/offering does not exist, operation proceeds to act 1316.

At act 1316, if the product developer does not locate a suitable insurance product template or insurance component in the product repository 1210, product category 1220, published templates library 1124 or published component library 1122, the user may request generation of a new template by a librarian. The librarian may create a new insurance product template or insurance component. Thereafter, operation continues to act 1318.

At act 1318, the requested insurance product template or product/offering is created by an individual authorized as a librarian. After an appropriate template or product/offering is located or created, the librarian may publish the newly created insurance product template in the published template Library 1124. The published template library 1124 may be stored in the library databases 150. The librarian may publish a new insurance product/offering as an insurance component in the published component library 1122 portion of the insurance component library 1102. The new insurance component may be stored in the databases 150. After the librarian publishes the requested insurance product template or insurance component, the operation continues to act 1320.

At act 1320, the ICC configuration workstation front end 300 may configure the user portal 110 to allow the business user to create a new product from the existing template or product/offering. The user interface 112 may allow the product developer to access the product repository 1210. The business user may reuse existing templates or products/offerings to more rapidly develop and test new products or offerings for sale in the insurance area. After the user completes creating a product from an existing template and/or product/offering, operation continues to act 1322.

At act 1322, the user may provide a name for the new product/offering and add additional information as warranted. Thereafter, operation proceeds to act 1324.

At act 1324, after the appropriate template or product/offering is created, the ICC configuration workstation front end 300 displays insurance components on user interface 112, which are associated with the selected product/offering or template. Thereafter, the operation proceeds to act 1326.

At act 1326 of FIG. 13B, an example of the ICC configuration workstation front end 300 may display insurance components on the user interface 112 for review by the user. After reviewing the displayed insurance components associated with the new template or product/offering, the design process proceeds to junction 1328. At junction 1328, the user may select either design path 1330 or design path 1340.

Following design path 1330, at act 1332, ICC configuration workstation front end 300 may allow the user to deselect undesired insurance components through the user interface 112. At act 1334, the user interface 112 may receive an indication from the user to deselect a component. In response to deselection of the undesired components, ICC configuration workstation front end 300 refreshes the display of insurance components to display the new insurance product/offering without the deselected insurance components. If the new insurance product template or product/offering does not include unnecessary components, the design process continues to act 1362. Otherwise, the deselection process continues until all unnecessary components are deselected and removed from the new insurance product template or product.

Returning to design flow path 1340, at act 1342, missing components from the insurance product template or product/offering may be added. If there are no missing components, the user continues to junction 1360.

Otherwise, if there are missing components, at act 1344, the search or library functions may be involved to locate an appropriate component. For example, at act 1344, the user accesses the search system to filter criteria necessary to locate the appropriate component to be added to the insurance product template or product/offering. Thereafter, operation continues to act 1346.

At act 1346, the workstation user interface 300 displays available insurance components that meet the search or filter criteria of act 1344. The business user may review the qualities and attributes of the available components. Thereafter, operation proceeds to act 1348.

At act 1348, the published insurance component that meets the criteria, stored in the Product Repository 1110, the Published Component Library 1122, or Published Template Library 1124, is selected. If none of the published insurance components meet the criteria or are inadequate, the user may request creation the desired insurance component. Thereafter, operation proceeds to act 1350.

At act 1350, the user interface may be configured to allow the user to request the desired insurance component from a librarian or a product developer qualified as a librarian. Thereafter, operation proceeds to act 1352.

At act 1352, the ICC Design and Configuration System 300 may allow an authorized user to create an insurance component or modify an existing insurance component resident within the insurance component library 1102 to meet the business requirement. After the requested desired component for the insurance product is developed, the business user may receive notification from the librarian or the developer of the insurance component that the appropriate insurance component is available. Accordingly, after the insurance component for the insurance product is available, operation returns to act 1346.

After the desired missing insurance components are selected, the operation 1300 continues to act 1354.

At act 1354, the desired insurance component is associated to other insurance components in the insurance product template or product/offering under development. Referring back to FIG. 4, insurance components are associated to each other by specifying a component-type relationship. Alternatively, in the case of establishing relationships based on rules, a rule-based relationship may be formed by specifying the rule-type relationship between the insurance components. After the new insurance component is associated with the existing insurance components in the insurance product template or product/offering, the operation continues to act 1362.

As depicted in FIG. 13C, at act 1362, ICC configuration workstation front end 300 may display the associated insurance components on user interface 112. Upon completion of a review of the associated insurance components, operation continues to act 1364.

At act 1364, ICC configuration workstation front end 300 may configure the user interface 112 to allow the insurance product template or product/offering to be saved as a new version. In response to receipt of a save instruction, user portal 110 may send a request to servers 130 to store the new version. Thereafter, operation continues to act 1366.

At act 1366, the ICC configuration workstation front end 300 may be configured to request execution of a coherency check on all or a portion of the newly developed insurance product. In response to receipt of the request for a coherency check, the user portal 110 transmits a request for a coherency check to servers 130. The servers 130 perform a coherency check to verify that the insurance components and underlying functionality of the insurance components or important relationships of the insurance components are proper and correctly implemented. Thereafter, operation proceeds to act 1368.

At act 1368, based upon a coherency report, the ICC design and configuration environment 230 may determine whether any of the insurance components in the insurance product/offering or template require modification. If the insurance components within the insurance product template or product/offering require modification, the operation may continue to act 1372.

At act 1372, the product developer may use the ICC configuration workstation front end 300 to modify the insurance components as necessary. For example, user interface 112 may receive a modification to the coverage information based upon selection of an Add/Remove Details link associated with an insurance component or template. As another example, the user interface 112 may be configured to receive a user selection to add a sub-coverage link to insurance sub-coverage component.

As yet another example, the rule type elections may be displayed, enabled, or modified. The ICC configuration workstation front end 300 may display on user interface 112 a limited number of available coverage rule types from which to select a coverage rule type based upon the insurance component, where the coverage rule types are consistent with a model of the desired operation of the insurance component. In some cases, the configuration workstation front end 300 may only allow some of the listed coverage types displayed on user interface 112 to be selected. After the insurance component modifications are completed, the operation continues to act 1370.

Otherwise, if none of the insurance components require modification, the operation continues to act 1370. At act 1370, the ICC configuration workstation front end 300, via user interface 112, prompts the user to provide an indication of whether additional insurance components are to be associated or removed from the insurance product or offering or insurance product template. In the event that additional insurance components need to be removed or associated with the insurance product template or product/offering, the operation returns to act 1326. Otherwise, at act 1374, the product developer may save the newly developed insurance product template or product/offering in the product repository 1210, published library of insurance product components 1120, or non-published library of insurance product components 1110, along with the modified insurance components and exits the operation 1300.

Figure 14A:
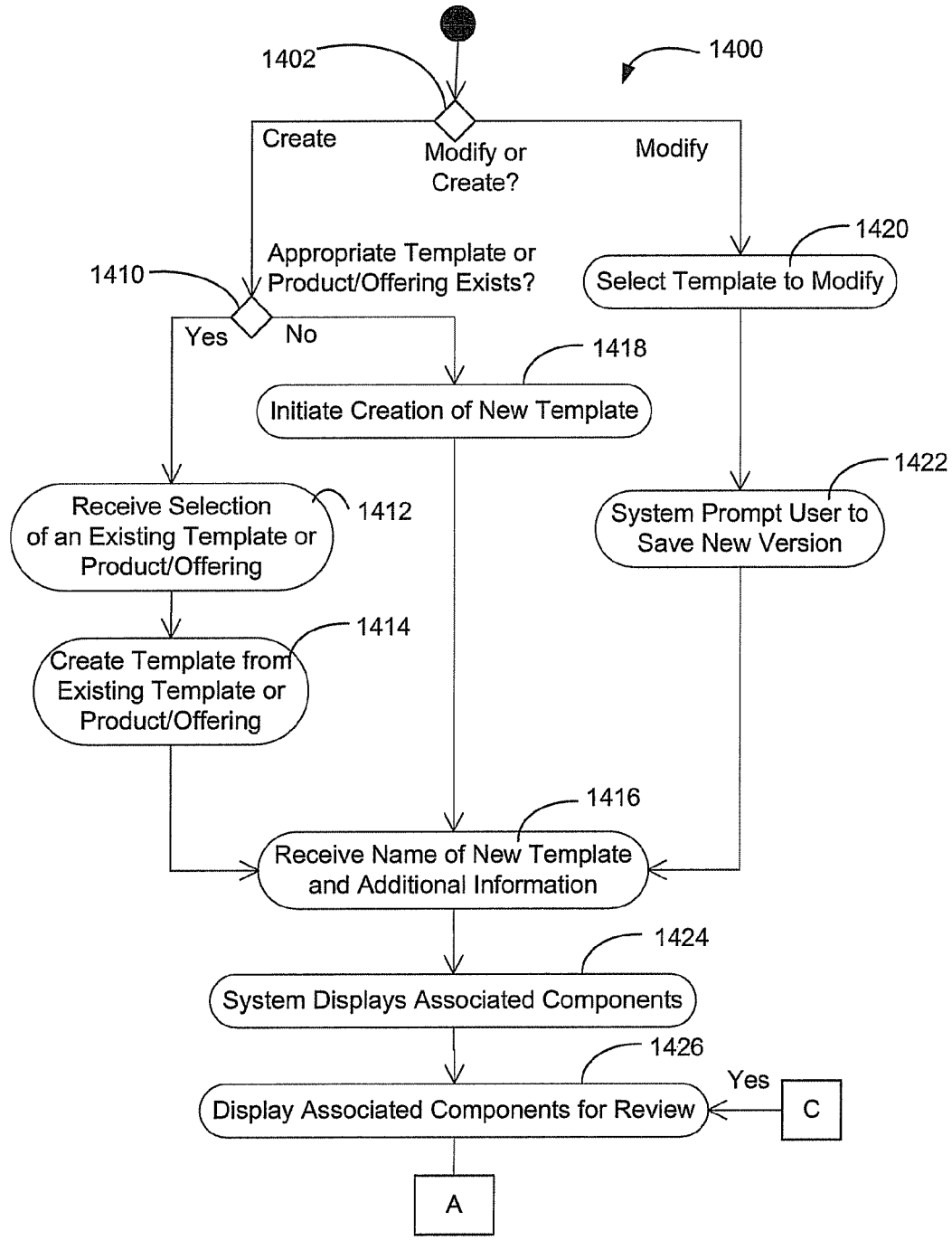
FIGS. 14A, 14B, and 14C depict an additional system for creating or modifying an insurance product template or a product offering.
Figure 14B:
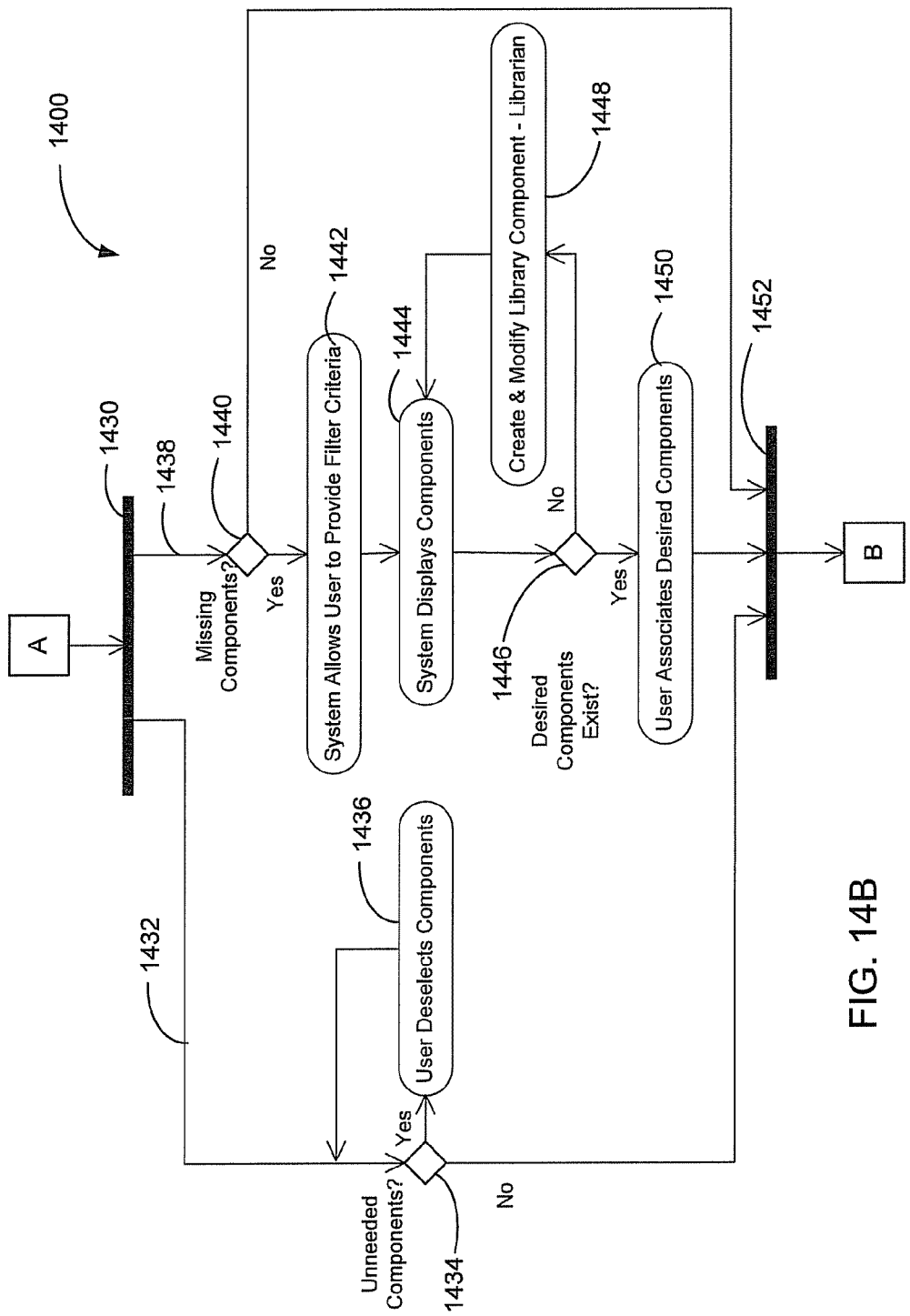
Figure 14C:
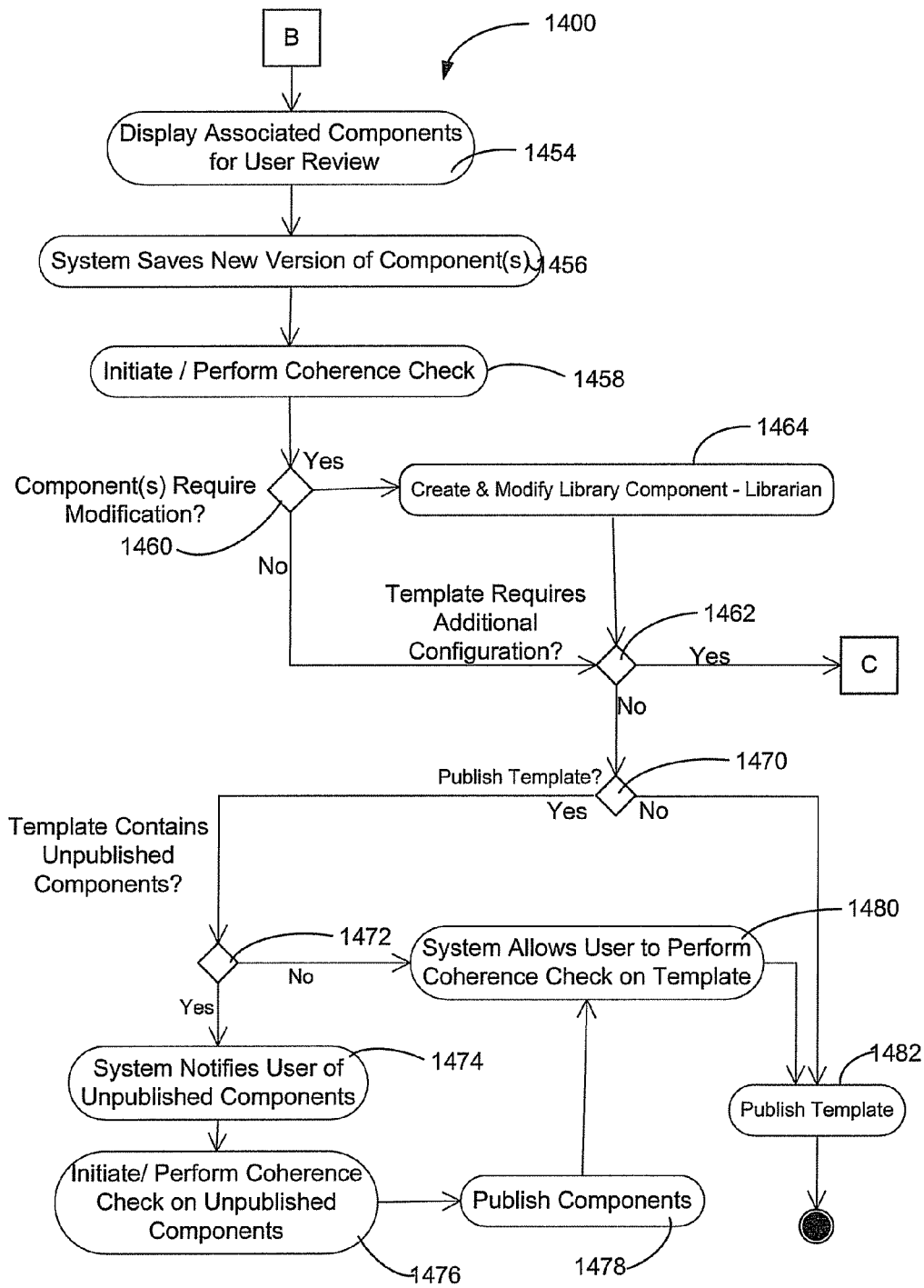

In FIGS. 14A, 14B, and 14C, an example operation 1400 includes a system for creating or modifying an insurance product template or a product/offering. At act 1402, the business user determines whether an existing template or product/offering should be modified to form the desired template or product/offering. If the user desires to create a new template or product/offering, the operation 1400 continues to act 1410. Otherwise, if the user decides to modify an existing template or product/offering, the operation 1400 continues to act 1420.

At act 1410, the ICC design and configuration environment 230 generates a selection to determine whether an appropriate template or product/offering exists. If an appropriate template or product/offering does not exist, the operation continues to act 1418. Otherwise, the appropriate template or product/offering does exist, and the operation 1400 continues to act 1412.

At act 1412, the ICC design and configuration environment 230 receives a selection of an existing template or product/offering that is to be copied to create a new template or product/offering. At act 1414, the ICC design and configuration environment 230 creates an insurance product template from an existing template or product/offering. At act 1418, a new, blank template is created. Thereafter, the operation 1400 continues to act 1416.

Alternatively, at act 1420, the user may modify an insurance product template. The ICC configuration workstation front end 300, via user interface 112, may display the Published Template Library 1124 of the Published Library of Insurance Product Components 1120. Alternatively, the user interface may be configured to display the contents of the product developer data base 1200. The user interface may receive a user selection of one of the insurance product templates stored in the product developer database 1200 or the insurance component library 1100. Upon receiving the selection, the servers 130 access the product databases 140 and library databases 150 to retrieve the selected insurance product template to be modified. Thereafter, operation 1400 proceeds to act 1422.

At act 1422, the process 1400 allows the user to save the new version of the insurance product template to be modified. Thereafter, the operation 1400 proceeds to act 1416.

At act 1416, the ICC configuration workstation front end 300 may allow the user to name the new template and add additional information to more fully describe the insurance product template or product/offering that is being created. Thereafter, the operation 1400 proceeds to act 1424.

At act 1424, the system 1400 displays, the ICC configuration workstation front end 300 may configure the user interface 112 to receive associations between insurance components within or with the new template. In response to receipt of the associations, new or updated associations are communicated to the servers 130.

The ICC configuration workstation front end 300 may display components and component relationships as specified in insurance component library 1102 or product repository 1210. The user interface 112 may be configured to permit the user to review the associated insurance components and determine whether any further action is necessary.

As an example, ICC configuration workstation front end 300 may configured the user interface 112 to receive a user input to highlight one of the insurance components of an insurance offering being built by the product developer. The user interface 112 may display a component window to be exported. The ICC configuration workstation front end 300 may include an exported window, which may include general coverage information, specific coverage information, sub-coverage information, covered items information, and rule types information.

In addition, the ICC configuration workstation front end 300 may configure user interface 112 to permit the product developer to associate additional insurance components to the displayed insurance product template. Thereafter, the operation 1400 proceeds to act 1426.

At act 1426, the ICC configuration workstation front end 300 may configure the user interface 112 to display the insurance product template and associated insurance components. The user interface 112 may be further configured to display the associated insurance components of the new template or product/offering, and permit the user to review the associated insurance components and/or the newly created template or offering. The operation 1400 continues to 1430, as depicted in FIG. 14B.

At 1430, the business user may follow two different design paths, 1432 or 1438.

Following design path 1432, at act 1434, insurance components may be removed from the insurance product template. If there are no unnecessary insurance components, the operation 1400 continues to junction 1452.

Otherwise, at act 1436, the ICC configuration workstation front end 300 may configure the user interface 112 to receive an indication that a component is undesired. The undesired components may be identified by deselecting the insurance components. As an example, the user interface 112 may be configured to receive a user instruction to remove the deselected insurance components from the displayed insurance product template. After the unnecessary insurance components are deleted, the operation 1400 continues to junction 1452.

Following design path 1438, the operation proceeds to act 1440, where the user interface may display the insurance components to permit the user to review for missing components. In the case that there are no missing insurance components, the user proceeds to act 1452.

Otherwise, operation proceeds to act 1442. At act 1442, the user interface 112 may receive, from the user, filter criteria to locate a desired insurance component in the insurance component library 1102 or insurance components residing in the product repository 1210. Thereafter, the operation 1400 proceeds to act 1444.

At act 1444, the ICC configuration workstation front end 300 may configure the user interface 112 to display insurance components that most closely relate to the filter criteria provided in act 1442. Based upon the displayed insurance components, at act 1446, the ICC configuration workstation front end 300 may configure the user interface 112 to receive selections of the desired insurance components. The selected insurance components may be added to the insurance product template via interaction with ICC configuration workstation front end 300. If the desired insurance components are not displayed, the operation 1400 continues to act 1448.

At act 1448, in response to the determination that the desired insurance components are not displayed or available, the ICC configuration workstation front end 300 may generate a request that a librarian or a qualified individual to create a new insurance component within the insurance component library 1112. The new insurance components may be generated from scratch or a modified version of an existing library insurance component. After the library insurance component is constructed, the operation 1400 returns to act 1444.

If the desired insurance components do exist, or have been created, the operation 1400 proceeds to act 1450.

At act 1450, ICC configuration workstation front end 300 may configure user interface 112 to receive selection of the desired insurance components. The user interface 112 may also receive association information. The ICC configuration workstation front end 300 may transmit the association information to the servers 130. In response to the association information, the servers 130 may associate the selected insurance components within the insurance product template or product/offering. Thereafter, the operation 1400 proceeds to junction 1452.

At junction 1452, the flow diagram may proceed to act 1454 in FIG. 14C. At 1452, the ICC configuration workstation front end 300 may configure user interface 112 to display all the associated insurance components within, for example, the insurance product template. After the user reviews the insurance product template, the operation 1400 proceeds to act 1456.

At act 1456, ICC configuration workstation front end 300 may send a request to servers 130 to save the new version of the newly created template or product/offering in the product database 140 or library database 150. Thereafter, the operation 1400 proceeds to act 1458.

At act 1458, the ICC configuration workstation front end 300 may prompt the user, through the user interface 112, to initiate a coherency check. Alternatively, after receipt of an indication that the user has completed a user review, the servers 1340 may automatically initiate a coherency check. During the coherency check, the servers 130 may automatically review either all or a portion of the insurance component portions and other sub-templates within the insurance product template or product/offering for coherency with the most up-to-date insurance component versions. After the coherency check is completed, the operation 1400 proceeds to act 1460.

At act 1460, the ICC configuration workstation front end 300 may configure user interface 112 to receive an indication that at least one of the insurance components associated within the insurance product template or product/offering requires modification. If the insurance components require modification, the operation 1400 proceeds to act 1464.

At act 1464, the library functions may be used to create and modify the library insurance components. After the library insurance components are created or modified to meet the insurance product requirements, or in the event that insurance component modifications are not required, the operation 1400 proceeds to act 1462.

At act 1462, the insurance product template may be examined to determine whether additional configuration is required. If the insurance product template requires additional configuration, the operation returns to act 1426. Otherwise, the operation 1400 continues to act 1470.

At act 1470, previous publication of the insurance product template into the library is determined. If the insurance product template was previously published into the library, the operation proceeds to act 1482, where the new or modified template is published. If the insurance product template was not previously published, the operation 1400 proceeds to act 1472.

At act 1472, the operation determines whether the newly created template contains unpublished insurance components. If the operation determines that the insurance product template contains unpublished insurance components, the operation 1400 proceeds to act 1474.

At act 1474, the operation notifies the business user of the unpublished insurance components. Thereafter, at act 1476, the operation may perform a coherency check on the unpublished insurance components. After successfully completing the coherency check on all of the unpublished insurance components within the new template, the operation 1400 proceeds to act 1476.

At act 1476, the operation 1400 performs a coherency check on the previously unpublished insurance components and proceeds to act 1478. At act 1478, the operation 1400 publishes the previously unpublished insurance components and proceeds to act 1480.

At act 1472, if the insurance product template does not contain any unpublished insurance components, the operation proceeds to act 1480. At act 1480, the operation may initiate a coherency check on the insurance product template prior to publication. The coherency check of the insurance components in the insurance product template and the insurance product template is performed prior to publication. After performance of the coherency check, the operation 1400 may proceed to act 1482. At act 1482, the completed insurance product template is published into the library and stored in one of the databases 140, 150. Thereafter, other users may utilize the newly created insurance product template.

Figure 15:
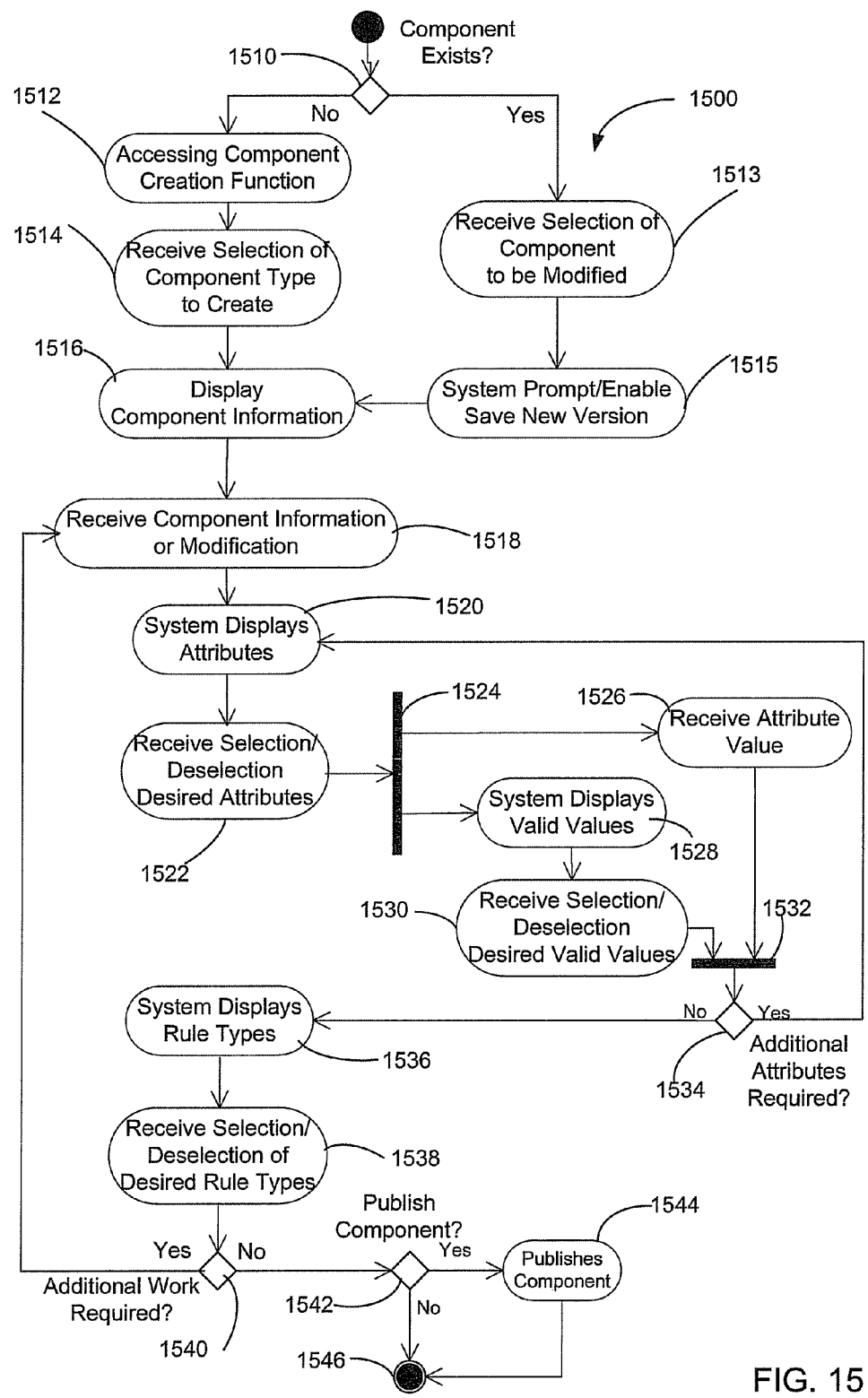
FIG. 15 depicts a system for modifying and creating components of an insurance product offering.

In FIG. 15, an example operational flow diagram creates and modifies components of an insurance product template or insurance product offering. At act 1510, the existence of the insurance component within the library, to meet the needs of the new insurance product template or insurance product/offering, is determined. If the insurance component exists, the operation 1500 proceeds to act 1513.

At act 1515, the user portal may receive a selection of an existing insurance product from the product repository 1212 or the published component library 1122. After selection of the insurance component, the operation 1500 proceeds to act 1515.

At act 1515, the operation may save the new version of the insurance component. After the operation saves the new version of the insurance component, the operation 1500 proceeds to act 1516.

Alternatively, if none of the insurance components stored in the insurance component library 1102 or product repository 1210 meet the needs of the insurance products, at act 1512, the user may access the component creation functions to create a component. Thereafter, the operation 1500 continues to act 1514

At act 1514, the insurance component creation function may receive a selection of a component type to be created. The ICC configuration workstation front end 300 may configure user interface 112 to display a variety of component types available. After receipt of the selection of a component type, the operation 1500 continues to act 1516.

At act 1516, ICC configuration workstation front end 300 may configure the user interface 112 to display the component information of either the selected component type, or the newly saved version of an existing insurance component. Thereafter, the operation 1500 proceeds to act 1518.

At act 1518, ICC configuration workstation front end 300 may configure user interface 112 to receive component information or modifications to allow the component information. Thereafter, in response to receipt of the component information, the user portal 110 transmits the updated component information to servers 130, and the operation 1500 proceeds to act 1520.

At act 1520, the ICC configuration workstation front end 300 configures the user interface 112 to display the attributes associated with the insurance component. Thereafter, the operation 1500 proceeds to act 1522.

At act 1522, ICC configuration workstation front end 300 may configured the user interface 112 to receive selections or deselections of desired attributes associated with the insurance component being created. Thereafter, in response to receipt of selection or deselection of various attributes of the insurance component, the ICC configuration workstation front end 300 may receive a save indication from the user interface 112. In response to the save indication, the user portal 110 may send the servers 130 the updated attribute information, and the operation 1500 proceeds to junction 1524.

In a first operation, at act 1526, the ICC configuration workstation front end 300 may configure user interface 112 to receive a value for the selected attributes. For example, the operation may receive coverage information including a value for attributes to be assigned. After the values have been entered, the operation 1500 proceeds to junction 1532.

In an alternative operation, at act 1528, the user interface 112 displays predetermined values for each of the attributes or at least a portion of the attributes. For example, the default value of the "coinsurance-maximum" attribute included in the coverage information may be assigned a value of 100. Thereafter, the operation 1500 proceeds to act 1530.

At act 1530, the user may select or deselect from the list of predetermined values. Based upon the selection or deselection of the desired values, the attribute of the insurance component is assigned a value. In some instances, the user interface 112 may display a nominal or default value. After the user completes the assignment of attribute values of the insurance component, the operation 1500 proceeds to 1532.

Thereafter, at act 1534, the user interface 112 may inquire whether additional attributes are needed to more fully specify the insurance product template. If additional attributes are required to more fully specify the insurance component, the operation returns to act 1520. Otherwise, if additional component attributes are neither required nor need to be assigned, the operation 1500 proceeds to act 1536.

At act 1536, the user interface 112 displays the rule types associated with the insurance component. For example, rule types displayed may include the default rule types of "Underwriting," "Financials," and "Credit." A coverage rule type may allow the user to select previously developed rules. Thereafter, the operation 1500 continues to act 1538.

At act 1538, user interface 112 may receive selections and deselections to choose component rule types. The selected and deselected component rule types are transferred to the server 130, which updates the insurance components. After the rule types have been established for each insurance component, the operation 1500 proceeds to act 1540.

At act 1540, the user interface 112 may be configured to receive a user indication that additional work is required to more fully specify the insurance component. If additional work or modification of the insurance component is required, the operation 1500 returns to act 1518. If additional work is not required on the insurance component, the operation 1500 proceeds to act 1542.

At act 1542, the user interface may receive a user instruction to either publish or not publish the insurance component. If the user does not desire to publish the insurance component, the operation proceeds to act 1546. Alternatively, if the user desires to publish the newly created insurance component, the operation 1500 proceeds to act 1544.

At act 1544, the insurance component is published into the published components library 1122. The published component may be used to develop insurance products or offerings. After the publication of the insurance component, the operation 1500 proceeds to exit at 1546.

Figure 16A:
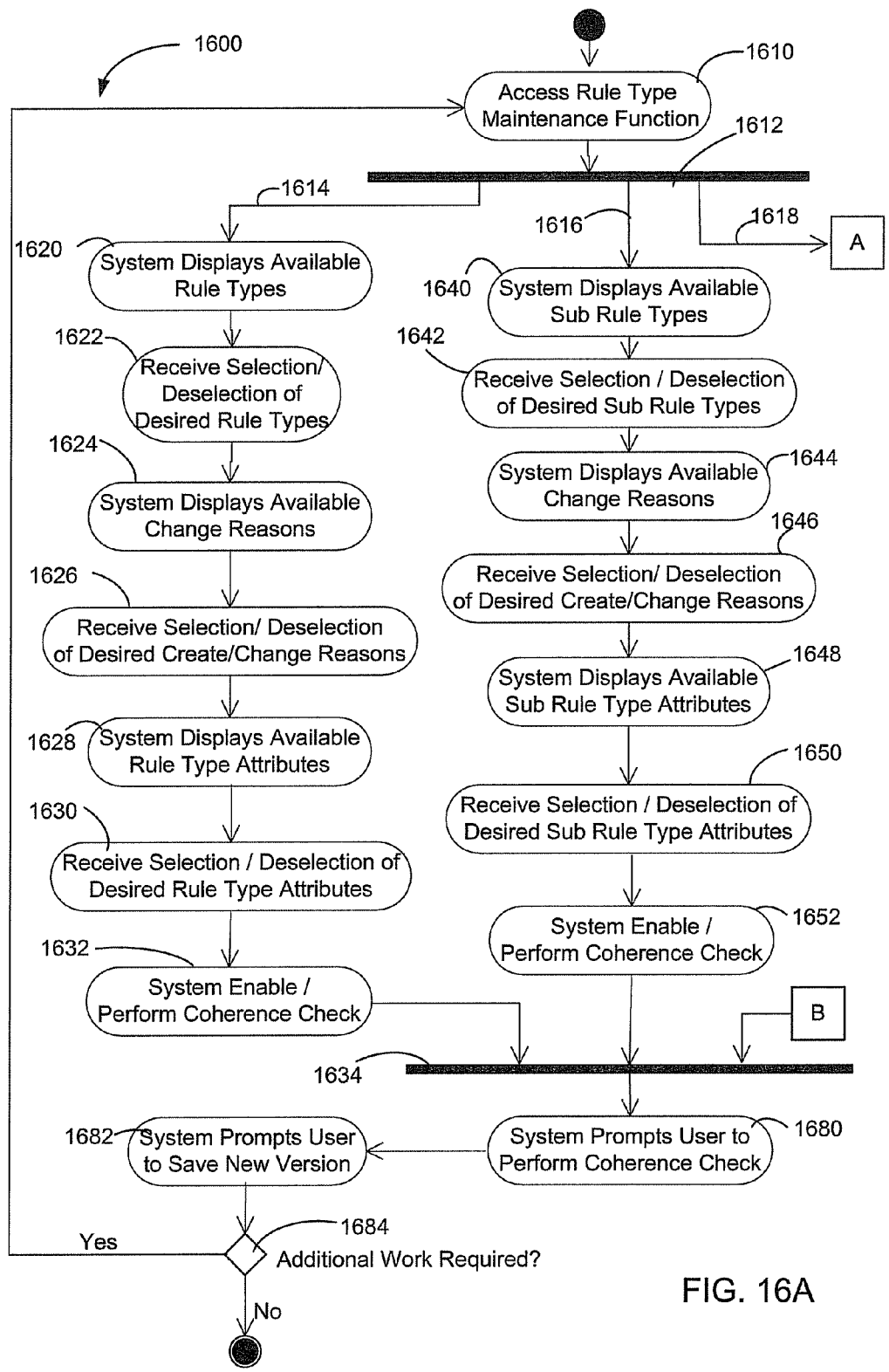
FIGS. 16A and 16B depict a system for creating or modifying rule types within the librarian and product developer library system.
Figure 16B:
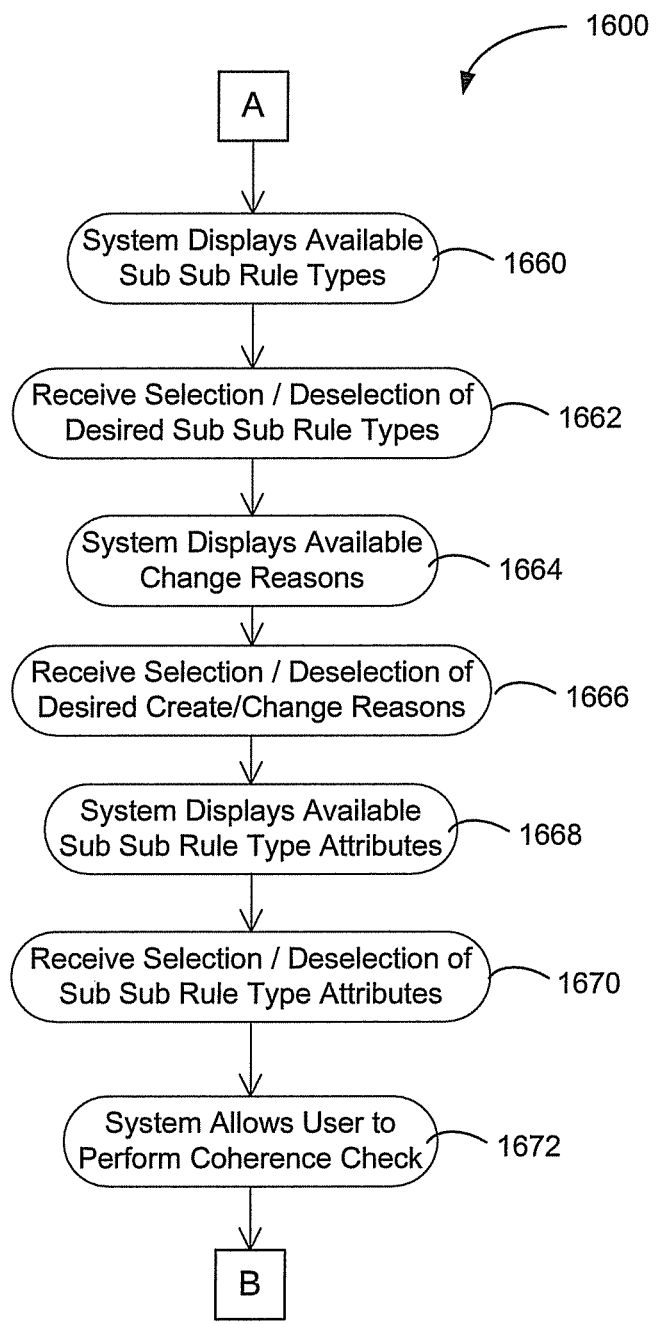

In FIGS. 16A and 16B, an example operational flow diagram creates or modifies rule types of an insurance component used to develop insurance products or offerings. At act 1610, the user accesses the rule type maintenance function. After accessing the rule type maintenance function, the operation 1600 continues to junction 1612.

At junction 1612, the user may follow one of the operations 1614, 1616, and 1618.

If the user selects operation 1614, at act 1620, the user interface 112 displays the available rule types for a particular insurance component. Thereafter, the operation 1600 continues to act 1622.

At act 1622, the desired rule types for the insurance component may be identified based upon selection or deselection of displayed rule types. Thereafter, the operation 1600 proceeds to act 1624.

At act 1624, the user interface 112 displays the available change reasons that the business user may enter to justify the change and provide information to later users of the insurance component. Thereafter, the operation 1600 proceeds to act 1626.

At act 1626, the selections or deselections of create/change reasons associated with the rule type modification are received and stored. Thereafter, the operation 1600 proceeds to act 1628.

At act 1628, the user interface 112 displays the available rule type attributes. Thereafter, the operation 1600 proceeds to act 1630.

At act 1630, selections or deselections of the displayed rule type attributes are received by user interface 112. Thereafter, at act 1632, the operation 1600 performs a coherency check for the insurance component with the newly stored rule change.

Otherwise, if the operation 1600 proceeds from junction 1612 to operation 1616, at act 1640, the user interface 112 displays available sub-rule types to the user. At act 1642, the selection or deselection of desired sub-rule types that are displayed on the user interface 112 are received. Upon completion of the selection/de-selection process, the operation 1600 proceeds to act 1644.

At act 1644, the user interface 112 displays available change reasons for the modification of the sub-rule types. Thereafter, the operation 1600 proceeds to act 1646.

At act 1646, the desired create/change reasons to provide documentation for the modification to the sub-rule type of a particular insurance component may be captured by the user interface 112 and stored in association with the modification. Thereafter, the operation 1600 proceeds to act 1648.

At act 1648, the user interface 112 displays available sub-rule type attributes that may be assigned. Thereafter, the operation 1600 proceeds to act 1650.

At act 1650, the selections and deselections from among the displayed sub-rule type attributes may be captured by the user interface 112. After the attributes are assigned, the operation 1600 proceeds to act 1652.

At act 1652, a coherency check of the modified rule/sub-rule type attributes and insurance components may be performed. Thereafter, the operation 1600 proceeds to 1634.

If operation 1600 proceeds to operation 1618, at act 1660, the user interface 112 displays the available sub/sub-type rules for an insurance component. Thereafter, the operation 1600 proceeds to act 1662.

At act 1662, selections or deselections of sub/sub-rule types are captured by the user interface 112. After the selection/de-selection process, the operation 1600 continues to act 1664.

At act 1664, the user interface 112 displays available change reasons that the user may use to identify the purpose for the modification to the sub/sub-rule types. Thereafter, the operation 1600 proceeds to act 1666.

At act 1666, the user interface 112 may capture selections or deselections of change reasons from the displayed list of desired create/change reasons. After the change reason for the desired change or creation of a sub/sub-rule type is captured, the operation 1600 proceeds to act 1668.

At act 1668, the user interface 112 displays available sub/sub-rule type attributes. Thereafter, at act 1670, the user interface may receive the desired sub/sub-rule type attributes based upon the displayed attributes to further describe or create the performance of the insurance component. Upon completion of the designation of the sub/sub-rule type attributes, the operation 1600 proceeds to act 1672.

At act 1672, a coherency check of the insurance component after the sub/sub-rule types may be initiated to verify compliance with the coherency rules. Thereafter, the operation 1600 proceeds to 1634.

From 1634, the operation proceeds to act 1680. At act 1680, the user interface prompts the user to perform a coherency check of the modified insurance components prior to saving the changes. After the coherency check is performed, operation proceeds to act 1682.

At act 1682, the user interface 112 may prompt the user to save the new version of the insurance component that includes the newly-created rule types, sub-rule types, or sub/sub-rule types. Thereafter, the operation 1600 proceeds to act 1684.

At act 1684, the operation generates a display on user interface 112 to determine whether additional work is required to further create or modify the rule types associated with an insurance component. In response to receipt of an indication that additional work is required, operation 1600 proceeds to act 1610. Otherwise, upon completion of the creation and modification rule types activities, the operation 1600 exits.

Figure 17:
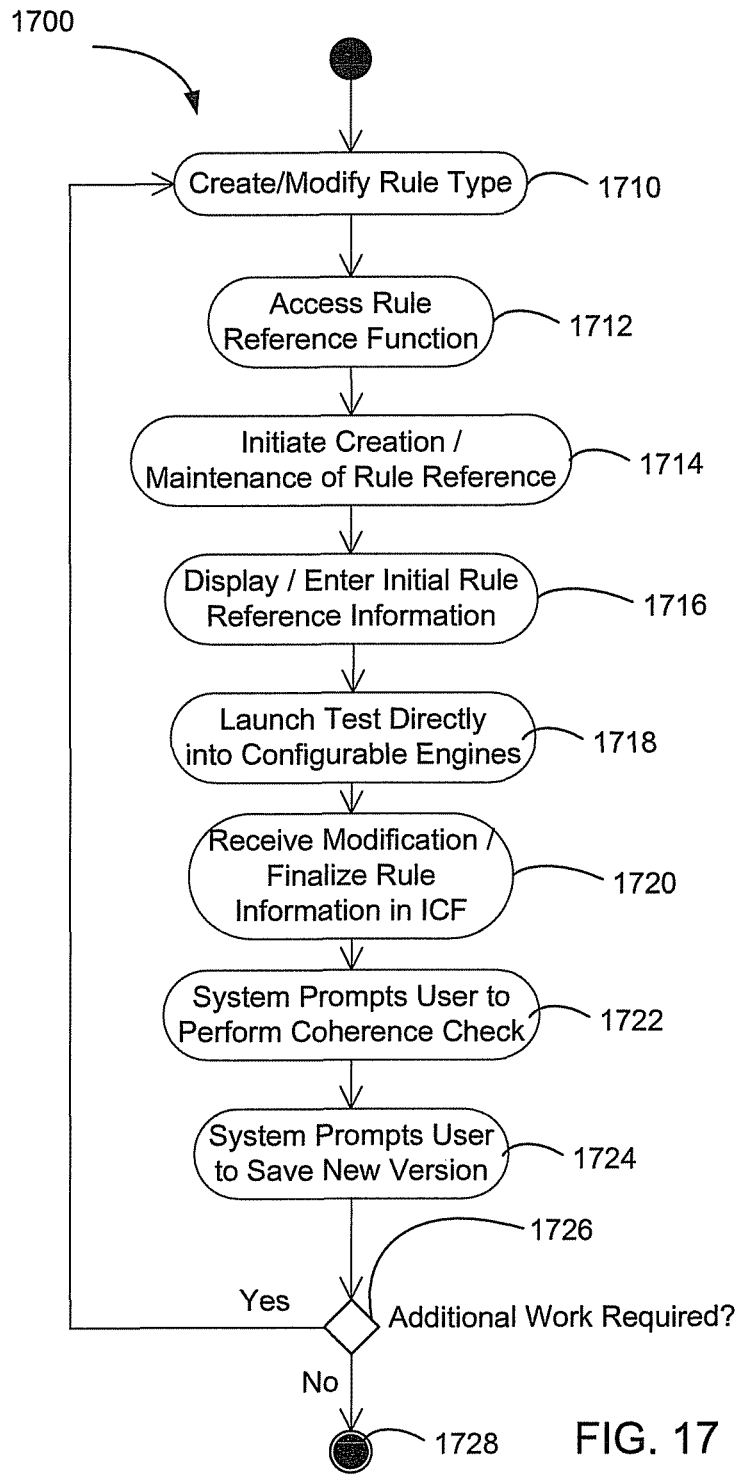
FIG. 17 depicts a system for creating and modifying rule references in the librarian and product developer system.

In FIG. 17, an example operational flow diagram or operation 1700 creates and modifies rule references in the librarian and product developer system. At act 1710, operation 1700 commences with the creation or modification of rule types. After the rule type is created or modified for a particular insurance component, at act 1712, a rule reference function is displayed on user interface 112. The rule reference function may be configured to display rule references or rule types and the associated links to the rule reference or rule types on the user portal 110. The user portal 110 may be further configured to receive an input from the user to specify a desired new rule reference function, code description for a selected rule reference, or rule type. Thereafter, the operation 1700 proceeds to act 1714.

At act 1714, the ICC core 310 executed on servers 130 may initiate creation/maintenance of the rule reference. After the rule reference function is initiated, at act 1716, the user interface 112 may display the initial rule reference information for the user to review. In addition, the user interface 112 may receive entries to the initial rule reference information or modifications to the rule reference information.

In response to receipt of the initial rule reference information and review of the work, the operation proceeds to act 1718.

At act 1718, the ICC core 310 executed on servers 130 may launch the rule into the target engines 160 in order to test the rule. The user may launch directly into the engines to verify the proper function of the created or modified rule type. The adapter component may retrieve the rule reference or rule type information from the network 120 and determine an appropriate engine to create an engine object in the memory of at least one of the engines 160. Thereafter, the ICC core 310 may determine the links available in at least one of the engines 160 to be associated with a particular rule reference or rule type. After determination of the available links and resources in the engines 160, the ICC core 310 may be configured to perform a coherence check to verify that the rule type or rule reference is supportable by the engines 160.

After reviewing the results provided by the engines at act 1720, the user may modify or finalize the rule information through the user interface 112. Thereafter, operation proceeds to act 1722.

At act 1722, the operation prompts the user to perform a coherency check of the modified rule type and underlying insurance component. Upon completion of the coherency check, at act 1724, the operation prompts the user to save the new version of the rule type.

At act 1726, the user interface may prompt the user to indicate whether additional work is required. If additional work is required, the user returns to act 1710. Otherwise, the user exits the operation at exit 1728.

As an example, system 10 may be configured to receive inputs from a business user, via user interface 112, to the ICC configuration workstation front end 300. For the purposes of this example, the terms user interface 112 and ICC configuration workstation front end 300 may be used interchangeably. Based upon the input to the user interface 112, the system 10 may create or develop insurance products based upon reusable product/offering definitions. The reusable product/offerings definitions may include reusable insurance based components 810 and templates 830, which permit a business user system 10 to develop and configure insurance products based upon a hierarchical set of insurance product components. An example of the hierarchical set of insurance components is the arrangement of insurance product components 832, 834, and 836 within insurance product template 831. The relationship between insurance product components 832, 834, and 836 describe a hierarchical tree structure or framework, which define the framework or structure of the insurance product template 831.

Depending upon the product need, additional insurance components may be further included to provide a desired level of componentization, flexible granularity, and reusable product structure. The flexible granularity may permit a user to more rapidly and predictably generate insurance product configurations and flexibly tailor the insurance products or offerings to meet a specific customer or market need.

As another example, system 10 may include a server 130 in communication with a network 120. The server 130 may be further configured to interface with an insurance component library database 1110 and an insurance product database 1200, which are stored in network accessible memory databases 140 and 150. The insurance component library database 1110 may be configured to store a plurality of insurance components 820. The insurance product database 1210 may also be configured to store at least one insurance product 842. The server 130 may be further configured to communicate with a plurality of configurable engines 160. The user portal 110 may be configured to communicate with the server 130 via the network 120. The user portal 110 may also be configured to generate an insurance product development interface to display at least a portion of the database which stores the insurance component library 1102.

User portal 110 may be configured to receive a first selection of a first insurance component. In response to selection of the first insurance component, the user portal 110 may request information associated with the first insurance component from the server 130. In response to receipt, by the user portal 110, of the requested information, the user portal 110 may display an attribute associated with the first insurance component. The user interface 112 may be further configured to receive an assignment of a value to an attribute, which is associated with the first insurance component or which governs the operation of the first insurance component.

Similarly, the user portal 110 may receive a second selection of a second insurance component from the plurality of insurance components displayed on the user portal, the user portal further configured to receive an assignment of a component relationship between the first insurance component and the second insurance component. Thereafter, the user portal 110 may be configured to receive a first selection of a first rule type for the first insurance component. As an example, the first rule type may be associated with a first configurable content resident on one of the plurality of configurable engines.

The user portal 110 may be configured to store an insurance product in the insurance product database 1200 as a function of the first insurance component, the second insurance component, the assignment of the component relationship between the first insurance component and the second insurance component, and the first rule type for the first insurance component.

Alternatively, or in addition, the user portal 110 may be configured to receive a modification request to change the component relationship between the first insurance component and the second insurance component. In response to the modification request, the server 130 may be configured to determine whether the modification request is allowable. In response to the determination by server 130 that the modification request is allowable, the user portal 110 may receive an indication from the server 130 that the component relationship between the first insurance component and the second insurance component is changed.

As another example operation of system 10, the user portal 110 may be configured to store the newly defined version of a previously defined insurance product in the insurance product database 1200. The operation of the new version of the insurance product may be created as a function of the first insurance component, the second insurance component, the assignment of the component relationship between the first insurance component, and the second rule type for the second insurance component.

System 10 may be further configured to permit a user to request information regarding a selected insurance component. As an example, the user portal may receive a selection of the first insurance component via the user interface 112. In response to selection of the first insurance component, the user portal 110 may request information associated with the first insurance component. Either after or in response to receipt of the information associated with the first insurance component, the user portal 110 may display the first rule type associated with the first insurance component on user interface 112. The displayed associations may be based upon the requested information associated with the first insurance component.

If the user desires to change the rule type associated with the first insurance component, the user portal 110 may be configured to receive a new selection of the first rule type for the first insurance component. In response to the new selection of the first rule type for the first insurance component, the user portal 110 may send the requested change to server 130. Thereafter, server 130 may associate the first rule type with a third configurable content resident on one of the plurality of configurable engines 160.

Alternatively, the user may select one of a plurality of insurance templates 831 stored a template library 830. Each of the insurance product templates include a plurality of hierarchically associated insurance components. For example, the first insurance component may be or include an insurance product template, wherein the insurance product template includes a plurality of hierarchically associated insurance components.

In response to receipt of a request from the user portal 110 to store the modified or new insurance product, the server 130 may be configured to validate coherency of the first insurance component and the second insurance component. Based upon validation of the coherency of the first insurance component and the second insurance component, the server 130 is may provide an indication that the components passed or failed the coherency check. Thereafter, the user interface 112 may prompt the user to store the insurance product in the insurance product database 1200.

As another example, the system 10 may include a server 130 having one or more processors in communication with a tangible media or memory. The tangible media or memory may include computer program code executable on one of the processors to create or modify an insurance product component, template, or product. The computer program code may further include instructions to create or store a plurality of insurance components configurable to form an insurance product, where each of the insurance components includes a component type table, a component type relationships table, a component type attribute table, and a component type rule types table, as described relative to FIGS. 5-7, and FIGS. 8A and 8B. The computer instructions may be carried out to implement the various examples and systems described herein. For example, the computer instructions may be executed by the processor of server 130 to store in the component type relationships table of each of the insurance components at least one relationship to another of the insurance components.

The respective relationships in each component type relationships table, created or stored by the server 130, may describe a hierarchical relationship structure of the insurance product. To further develop the insurance components, the server 130 may execute computer instructions to store, in the memory of the server 130, at least one attribute entry in each component type attribute table of each of the components of the insurance product, where each attribute describes an aspect of the insurance product. The server 130 may further execute to store an association to a configurable content resident on one of a plurality of configurable engines 160 in the component type rule types table of each of the components of the insurance product.

An example association may include a network address, an internet address, or a Universal Resource Locator (URL). The association to the configurable content resident on one of the plurality of configurable engines 160 may includes a network designator configured to invoke a process on one of the configurable engines.

An example component type table 810 of at least one of the components of the insurance product may describe a product component type, a line of business component type, or a coverage component type, as depicted in FIG. 8A. The component type attribute table may, for example, include an attribute entry for a deductible amount, a co-insurance amount, a limit amount, or a combination thereof.

The insurance components of the insurance product include a component type rule type relationship table. At least one of the component type rule types tables includes a sub-rule which is associated with configurable content resident on one of the plurality of configurable engines 160.

The server 130 may also be configured to execute instructions to modify an entry of the component type rule types table of one of the components of the insurance product. After the modification, the server may automatically, or upon receipt of a user input, verify the modified entry to the component type rule types table as a function of a test with one of the plurality of configurable engines 160. In response to receipt of a response from the one of the plurality of configurable engines, the server may determine whether the response from the one of the plurality of configurable engines indicates that the modified entry to the component type rule types table passed the test.

As another example, the server 130 may be configured to execute software instructions for accessing an insurance component database comprising a plurality of insurance components configured to represent portions of an insurance product. The server 130 may be configured for creating at least one hierarchical relationship between the first insurance component and a second insurance component. The hierarchical relationship may describe a structural relationship of the insurance product, as depicted by the insurance product template 831 of FIG. 8. The relationship between insurance components 832, 834, and 836 are hierarchically related in a structure that forms at least part of a Product BOP.

Thereafter, the servers 130 may be configured for associating the first insurance component with at least one of a configurable content resident on one of a plurality of configurable engines 160. Each of the insurance components may include a component type relationships table, a component type attribute table, and a component type rule types table, as depicted in FIG. 8A.

While various examples of the invention have been described, it will be apparent to those of ordinary skill in the art that many more examples and implementations are possible within the scope of the invention. Accordingly, the invention is not to be restricted except in light of the attached claims and their equivalents.

We claim the following:

1. A system for defining an insurance product offering based upon reusable components comprising:
   a server configured to communicate via a network, the server further configured to interface with an insurance component library database and an insurance product database, wherein the insurance component library database is configured to store a plurality of insurance components, and the insurance product database is configured to store at least one insurance product, and wherein the server is further configured to communicate over the network with at least one engine server comprising a plurality of configurable engines configured to pass instructions and data between the server and an engine database;
   the server configured to communicate with a user portal via the network, the user portal configured to generate an insurance product development interface to display at least a portion of the insurance component library;
   the server further configured to receive via the user portal a first selection of a first insurance component and a second selection of a second insurance component from the plurality of insurance components displayed on the user portal;
   the server further configured to receive via the user portal an assignment of a component relationship between the first insurance component and the second insurance component;
   the server further configured to receive via the user portal a first selection of a first rule type for the first insurance component, wherein the first rule type and the component relationship are mapped to a first configurable content resident on one of the plurality of configurable engines of the at least one engine server, the one of the configurable engines identified by the server based on an association of the one of the configurable engines and the selected first and second components, the configurable content being configured in the identified one of the configurable engines in response to the rule type and the component relationship for access and control by the server to support the insurance product offering; and
   the server further configured to store an insurance product in the insurance product database as a function of the first insurance component, the second insurance component, the assignment of the component relationship between the first insurance component and the second insurance component, and the first rule type for the first insurance component.

2. The system of claim 1, further comprising:
   the server further configured to receive the selection of the first insurance component via the user portal;
   in response to selection of the first insurance component, the server further configured to request information associated with the first insurance component;
   the server further configured to direct the user portal to display an attribute associated with the first insurance component; and the server further configured to assign a value to the attribute associated with the first insurance component.

3. The system of claim 1, further comprising:
the server further configured to receive via the user portal a selection of the first insurance component;
in response to receipt of the selection of the first insurance component, the server further configured to direct the user portal to display the component relationship between the first insurance component and the second insurance component;
the server further configured to receive via the user portal a modification request to change the component relationship between the first insurance component and the second insurance component;
in response to the modification request, the server configured to determine whether the modification request is allowable; and
in response to the server determination that the modification request is allowable, the server further configured to transmit an indication to the user portal that the component relationship between the first insurance component and the second insurance component is changed.

4. The system of claim 1, wherein the one of the plurality of configurable engines is a first one of the configurable engines, and the server is further configured to receive via the user portal a second selection of a second rule type for the second insurance component, wherein the second rule type is associated with a second configurable content resident on a second one of the plurality of configurable engines; and
the server is further configured to store the insurance product in the insurance product database as a new version of the insurance product as a function of the first insurance component, the second insurance component, the assignment of the component relationship between the first insurance component, and the second rule type for the second insurance component.

5. The system of claim 4, further comprising:
the server further configured to receive a selection via the user portal of the first insurance component;
in response to selection of the first insurance component, the server is further configured to request information associated with the first insurance component via the user portal;
in response to receipt of the information associated with the first insurance component, the server is further configured to direct the user portal to display the first rule type associated with the first insurance component based upon the requested information associated with the first insurance component;
the server further configured to receive a new selection of the first rule type for the first insurance component via the user portal; and
in response to the new selection of the first rule type for the first insurance component, the first rule type is associated with a third configurable content resident on the first one of the plurality of configurable engines.

6. The system of claim 1, wherein the insurance component library database includes a plurality of insurance product templates, wherein each of the insurance product templates include a plurality of hierarchically associated insurance components.

7. The system of claim 1, wherein the first insurance component includes an insurance product template, wherein the insurance product template includes a plurality of hierarchically associated insurance components.

8. The system of claim 1, wherein in response to receipt of a request from the user portal to store the insurance product, the server is configured to validate coherency of the first insurance component and the second insurance component; and
based upon validation of the coherency of the first insurance component and the second insurance component, the server is further configured to store the insurance product in the insurance product database.

9. A method for generating an insurance product comprising:
accessing, with a processor, an insurance component database comprising a plurality of insurance components configured to represent portions of an insurance product;
retrieving from the insurance component database with the processor a first insurance component;
displaying the first insurance component on a graphical interface;
creating and storing, with the processor, at least one hierarchical relationship between the first insurance component and a second insurance component;
the processor storing at least one rule type in association with the first insurance component and the second insurance component based on the hierarchical relationship;
identifying, with the processor one of a plurality of configurable engines implemented on at least one engine server, the one of plurality of configurable engines identified based on the hierarchical relationship and the at least one rule type associated with the first insurance component;
the processor associating the first insurance component with configurable content resident on the identified one of a plurality of configurable engines; and
associating, with the processor, the configurable content in the identified one of the configurable engines with the first insurance component based on the rule type and the hierarchical relationship, the configured configurable content comprising a communication link formed between the at least engine server implementing the identified one of the configurable engines and the first insurance component as part of the association; and
accessing the at least one engine server and controlling the identified one of plurality of configurable engines with the processor using the communication link to support the insurance product offering.

10. The method of claim 9, wherein each of the insurance components includes a component type relationships table, a component type attribute table, and a component type rule types table, the hierarchical relationship stored in the component type relationships table, and the at least one rule type stored in the component type rule types table.

11. The method of claim 9, wherein associating, with the processor, the configurable content in the identified one of the configurable engines comprises:
storing the rule type, wherein the rule type references an addressable network location of the at least one engine server that is associated with the configurable content of the identified one of the configurable engines implement on the at least one engine server.

12. The method of claim 9, further comprising assigning, with the processor, at least one attribute entry to the first insurance component.

13. The method of claim 12, wherein assigning, with the processor, the at least one attribute entry to the first insurance component comprises:
storing, with the processor, the at least one attribute entry for the first insurance component, wherein the at least one attribute entry defines an aspect of the insurance product.

14. The method of claim 9, wherein creating, with the processor, the at least one hierarchical relationship between the first insurance component and the second insurance component comprises:

the processor storing in a first component type relationships table of the first insurance component an association to the second insurance component;

the processor storing in a second component type relationships table of the second insurance component an association to the second insurance component; and wherein the hierarchical relationship describes a structural relationship of the insurance product.

\* \* \* \* \*